(12) United States Patent
Terfloth et al.

(10) Patent No.: US 9,976,064 B2
(45) Date of Patent: May 22, 2018

(54) ADHESIVE COMPOSITIONS BASED ON RENEWABLE RAW MATERIALS AND USE THEREOF

(71) Applicant: Jowat AG, Detmold (DE)

(72) Inventors: Christian Terfloth, Detmold (DE); Carola Gantner, Detmold (DE)

(73) Assignee: Jowat AG, Detmold (DE)

( * ) Notice: Subject to any disclaimer, the term of this patent is extended or adjusted under 35 U.S.C. 154(b) by 201 days.

(21) Appl. No.: 14/221,781

(22) Filed: Mar. 21, 2014

(65) Prior Publication Data

US 2015/0191635 A1  Jul. 9, 2015

(30) Foreign Application Priority Data

Mar. 22, 2013 (DE) .................. 10 2013 004 909

(51) Int. Cl.
| | | |
|---|---|---|
| *C08J 3/22* | (2006.01) | |
| *C08K 5/01* | (2006.01) | |
| *C08L 91/08* | (2006.01) | |
| *C09J 167/04* | (2006.01) | |
| *B32B 37/12* | (2006.01) | |
| *B65C 3/06* | (2006.01) | |
| *B65C 9/20* | (2006.01) | |
| *C08K 5/11* | (2006.01) | |

(52) U.S. Cl.
CPC ......... *C09J 167/04* (2013.01); *B32B 37/1284* (2013.01); *B65C 3/06* (2013.01); *B65C 9/20* (2013.01); *C08K 5/11* (2013.01); *B32B 2471/00* (2013.01); *B32B 2605/08* (2013.01)

(58) Field of Classification Search
None
See application file for complete search history.

(56) References Cited

U.S. PATENT DOCUMENTS 5,252,646 A * 10/1993 Iovine ............... C09J 167/04
524/270
2011/0135924 A1* 6/2011 Takahira ............ C08G 18/4202
428/355 R

* cited by examiner

*Primary Examiner* — Robert T Butcher
(74) *Attorney, Agent, or Firm* — Edward E. Sowers; Brannon Sowers & Cracraft PC

(57) ABSTRACT

The present invention relates to an adhesive composition based on renewable raw materials, more particularly to a pressure-sensitive adhesive composition, as well as to the use thereof.

14 Claims, No Drawings

ADHESIVE COMPOSITIONS BASED ON RENEWABLE RAW MATERIALS AND USE THEREOF

This present application claims priority to German Application No. DE 10 2013 004 909.1, filed Mar. 22, 2013, and incorporates all by reference herein, in its entirety.

BACKGROUND

The present invention relates to the technical field of adhesive compositions based on renewable raw materials.

The present invention relates more particularly to adhesive compositions, especially pressure-sensitive adhesive compositions, based on renewable raw materials, and also to their use.

The present invention further relates to a method of joining at least two substrates by adhesive bonding.

The concept of "adhesive bonding" describes in general a manufacturing process for the physical joining of substrates. With adhesive bonding, the adhesive adheres by physical interaction—occasionally also by chemical interaction—referred to as adhesion, to the substrates, and connects them usually permanently. Since adhesive bonding on the one hand permits extensive and force-mediated joining of the adherends and on the other hand, on the basis of its non-aggressive properties, is suitable for connecting almost all materials to one another, adhesive bonding techniques are employed diversely both for domestic requirements and for industrial application. Other joining techniques, such as welding or soldering, for example, but also screwing, are increasingly being replaced by adhesive bonding methods. Around 50% of the goods produced in Germany, for instance, are now associated with adhesives.

Of increasing importance in this context are pressure-sensitive adhesives (PSAs), which are non-curing, permanently tacky adhesives whose chemical state exhibits little or no change after the adhesive has been completed. PSAs possess a permanent surface tack, as it is known, which enables them to bond by gentle applied pressing, without supply of thermal energy and without chemical reactions. PSAs typically possess a dynamic build-up of adhesion; in other words, the ultimate strength of the adhesive bond is achieved only after a number of minutes or even days. On the basis of their specific mode of application, PSAs are divided into three groups:

One widespread possibility for use of PSAs is in restickable products, for which the adhesive has only a low bond strength. The adhesive system is undamaged on detachment and is capable of repeated bonding. Examples of this are sticky notes or closure bonds, such as those of paper handkerchief packs or of wet-wipe packs, for example.

Another widespread possibility for use of PSAs is in releasable products in which the PSA is of moderate to high bond strength. With these products, the adhesive bond, designed for permanent bonding, can be released again, often, indeed, with the possibility of residue-free release of the adhesive bond. Releasable products in this sense are, for example, plasters, stickers, labels, self-adhesive sheets and packaging tapes.

Lastly, PSAs are also being employed increasingly for permanent-bonding products, the PSA in this case possessing a particularly high bond strength and being suitable for semi-structural applications. Permanent-bonding products with PSAs are therefore often used for industrial applications, such as in the fixing of exterior mirrors or protective strips or on damping-stiffening elements in vehicle construction, for example. Other applications are in window and facade construction, in mirror bonds, and also in the production of electronic articles, such as mobile phones, for example, or else of self-adhesive products which on detachment are deliberately to be visibly altered or destroyed, such as model plates or testing-certificate roundels for cars.

Adhesive systems in general, and including PSA systems in particular, are based primarily, if not, indeed, exclusively, on petrochemical products. A consequence of this is that, given growing demand for crude oil and crude oil-based products in tandem with limited supply, the price of crude oil and hence also of crude oil-based products is continually rising. Accordingly, adhesives and the products on which they are used are at the same time becoming more costly to produce, which means that the use of adhesives is in certain products no longer profitable or is making those products more expensive.

Furthermore, the use of crude oil-based products, more particularly adhesives, contributes to further consumption of fossil raw materials, meaning that their use leads to an unfavourable $CO_2$ balance and, ultimately, contributes to global warming and to climate change.

Against this background there has been no lack of attempts in the prior art to provide adhesive systems based on renewable raw materials.

For instance, US 2001/0045604 A1 discloses a multilayer biodegradable film which has a layer of a biodegradable PSA. The acrylate-containing biodegradable PSA actually employed, however, is a petrochemical product and not, for instance, a product based on renewable raw materials.

US 2008/0057300 A1 describes biodegradable two-component fibres which are based on polylactides and which develop tack on heating. The fibres described therein do not possess hot-melt PSA suitability.

Furthermore, DE 1 99 44 159 A1 relates to water-soluble, low-emission and biodegradable adhesive mixtures based on polyaspartic acid and/or the salts and derivatives thereof. The adhesive mixtures consist solely of polyaspartic acid and/or its salts and/or derivatives, and also natural adhesive resins. This specific combination of ingredients is suitable only for a narrowly confined field of application.

EP 0 741 177 A2 describes hot-melt adhesive compositions which are prepared from a thermoplastic polymer which is biodegradable or can be decomposed by water, with the assistance of sucrose benzoate as tackifier.

Furthermore, EP 0 899 274 A1 relates to graft copolymers for which polylactide units are applied by means of graft polymerization to a saturated polymeric backbone, and which can be used as a thermoplastic elastomeric component in a hot-melt adhesive.

WO 96/05264 A1 discloses PSAs based on poly(β-hydroxyorganyls).

EP 0 438 426 B1 relates to a system for the controlled delivery of bioactive constituents, the constituents being held by a polymeric composition comprising sections of poly(R-lactide) interlocked with sections of poly(S-lactide).

DE 100 54 277 A1 relates to tearing strips whose parent polymeric films and also coatings applied thereto are biodegradable. The tearing strips can be used in conjunction with biodegradable packaging materials.

Furthermore, DE 692 03 713 T3 discloses a hot-melt adhesive based on polyhydroxybutyrate/hydroxyvalerate.

Furthermore, WO 94/10257 A1 discloses a hot-melt adhesive composition based on polylactides.

DE 198 55 100 A1 discloses an adhesive which is biodegradable.

Furthermore, DE 694 22 053 T2 describes biodegradable or compostable hot-melt adhesives which comprise polyesters based on lactic acid.

Moreover, WO 02/070583 A2 describes biodegradable polymeric compounds based on polylactides and also their use as hot-melt adhesives.

With the aforementioned polymers and adhesive systems, however, it is not possible to provide adhesive systems, more particularly PSA systems, which have capacity to compete, both economically and on a performance basis, with petrochemically based adhesive systems.

More recently, however, there has been increased demand for biobased and/or biodegradable adhesives. Drivers for the elevated demand include on the one hand an ever-growing awareness of environmental issues, and on the other hand the more and more frequent supply bottlenecks and associated price rises in crude oil-based raw materials such as, for example, styrene-isoprene-styrene block copolymers and hydrocarbon resins, which constitute the main constituents of the PSAs presently produced.

In the market for food packaging, for example, there is interest in biodegradable products. Within the sector of plastics for producing films or trays for foods, or else for disposable tableware, there is already a relatively wide selection of biobased and biodegradable products. Base materials employed here are, for example, alongside PLA, PHB and modified starch. Through the use of adhesives based on renewable raw materials it would be possible to provide entirely biodegradable, biobased packaging.

The use of renewable raw materials in adhesives applications often multiplies the production costs, meaning that, in spite of the improved $CO_2$ balance and the improved environmental effect, the use of these adhesive systems in industrial applications does not make economic sense. Moreover, adhesive systems based on renewable raw materials often fail to attain the same properties as their petrochemical-based counterparts. This is true especially of the bond strength and also of the resistance of the bond towards environmental effects, such as temperature changes, for example, or else chemicals.

As a result of this, there is currently on the market no adhesive system available based on renewable raw materials that would be able in terms of its applications properties and its profile of properties to compete with petrochemical-based adhesive systems, let alone one which would be economically competitive. In particular there has to date been no hot-melt PSA available that is based on renewable raw materials.

SUMMARY

The object of the present invention, therefore, is to provide an adhesive composition based on renewable raw materials, and a corresponding joining method, with which the disadvantages and problems outlined above, occurring in association with the prior art, are to be at least largely avoided or else at least attenuated.

It is an object of the present invention more particularly to provide an adhesive composition based on renewable raw materials which has a profile of properties which, in terms of the bond strength and also the duration and durability of the bonded join, can compare with petrochemical-based adhesive systems, and, furthermore, is economically competitive, i.e. has production costs within the range of petrochemical-based adhesive systems.

It is an object of the present invention, moreover, to provide a joining method which is based on the use of adhesive compositions based on renewable raw materials and which is suitable for a host of applications in the industrial and home sectors.

The above-outlined objectives are achieved in accordance with the invention by means of an adhesive composition according to claim 1; further advantageous developments and embodiments of the adhesive composition of the invention are subject matter of the relevant dependent claims.

Additionally provided by the present invention is a method of joining at least two substrates by adhesive bonding according to the respective independent claim; further, advantageous developments and embodiments of this aspect of the invention are subject matter of the relevant dependent method claims.

Further subjects of the present invention in turn are the uses of the adhesive compositions of the invention, according to the respective claims.

It is self-explanatory that peculiarities, features, embodiments and refinements, and also advantages or the like, which are stated below—in order to avoid unnecessary repetition—only for one aspect of the invention do of course apply accordingly in relation to the other aspects of the invention, without any need for explicit mention.

Furthermore, it is self-explanatory that, in case of the indication below of values, numbers and ranges, the relevant value, number and range information should not be considered to be restricting; instead, it is self-explanatory to the skilled person that, as a result of the specific case or in the context of the particular application, departures may be made from the stated ranges or information without departing from the scope of the present invention.

It is the case, furthermore, that all of the value and parameter information or the like that is specified below can in principle be determined or ascertained using normalized or standardized, or explicitly indicated, determination methods or else with determination techniques that are familiar per se to the skilled person in this field.

Subject to the above, the present invention is described in more detail hereinafter.

DESCRIPTION

The present invention accordingly provides—according to a first aspect of the present invention an adhesive composition based on renewable raw materials, more particularly a pressure-sensitive adhesive composition, the adhesive composition comprising:
(a) at least one polymer based on polylactic acid;
(b) at least one resin and/or one plasticizing agent (plasticizer);
(c) optionally at least one wax.

The present invention accordingly provides an adhesive composition which is formed on the basis of renewable raw materials, more particularly, that is, on the basis of polylactic acid, and which in its profile of properties is comparable with petrochemical-based adhesive systems and is also economically competitive.

Particularly good results are obtained in the context of the present invention if the composition of the invention comprises as component (b) at least one resin and at least one plasticizing agent (plasticizer).

Through the resin on the one hand and the plasticizing agent or plasticizer on the other it is possible for the adhesive properties and also the rheological properties of the adhesive composition of the invention to be adjusted specifically. On condition that the composition of the invention comprises a resin which possesses plasticizing properties, however, it is also possible to do without an additional plasticizing agent or plasticizer. Equally it is possible for the adhesive composition of the invention, further to component (a), the lactic acid-based polymer, to have only a plasticizing agent or plasticizer, and no resin. This embodiment may be realized more particularly when the polymer (a) and/or the plasticizing agent or plasticizer possess a sufficiently high inherent tack. Generally speaking, however, the adhesive compositions of the invention comprise not only resins but also plasticizing agents (plasticizers).

Polylactic acids, also referred to synonymously as polylactides, are obtainable industrially by a simple route, through polycondensation of lactic acid or through ionic polymerization of lactides. The lactic acid starting material needed is obtained in general by means of biotechnological processes, by fermentation of carbohydrates, such as sugars or starches, for example. In addition, lactic acid may also be obtained by catalytic dehydrogenation of polyhydric primary alcohols and also hydroxyaldehydes. One process of this kind is described in DE 10 2008 013 474 A1, for example.

Lactic acids and also polylactic acids and polylactides are therefore available on an industrial scale and in terms of production costs are comparable with petrochemical products. In the absence of other adjuvants, pure polylactides and polylactic acids (also referred to as PLA; Poly Lactic Acid) produce extremely brittle and fragile plastics and are consequently unsuited to the production of adhesive systems. In the context of the present invention, however, success has now been achieved for the first time in providing adhesive systems, more particular pressure-sensitive adhesive compositions, which are based on polylactic acids or polylactides and possess outstanding applications properties.

As already observed above, polylactic acid and polylactides refer to macromolecules that are chemically the same. The difference between the two terms lies only in the production process. The monomer for PLA is lactic acid, present in the form of two stereoisomers, namely L- and D-lactic acid.

When lactic acid is produced by fermentation, optically active forms of the lactic acid are obtained. Homofermentative lacto bacteria generate exclusively L(+)-lactic acid; heterofermentative lacto bacteria generate either a racemic mixture or else D(−)-lactic acid. The ratio between L- and D-lactic acid is dependent on the fermentation parameters (temperature, pH, etc.) and on the state of the bacterial culture.

Much apparatus is involved in obtaining monomeric lactic acid, since on accumulation in aqueous solution the acid has a propensity towards self-condensation, and oligomers are formed. This reaction behaviour for the formation of linear polyesters is therefore also utilized for the synthesis of polylactic acid. For the preparation of PLA there are in principle two different synthesis pathways that can be employed. Where one of them is polycondensation, in which a polymer is generated directly from lactic acid. An alternative to the PLA preparation is the ring-opening polymerization of dilactides. Dilactides are obtained by distillative dehydration of lactic acid, followed by cyclizing depolymerization.

Dilactides are likewise optically active. The different stereoisomers of polylactic acid and of polylactide can be derived in dependence on the monomers used. Since dilactides possess two asymmetric carbon atoms, there are three different configurations: two enantiomers, D- and L-dilactide, and a meso-form, consisting of one molecular unit each of D- and L-lactic acid, this form having no optical activity.

The corresponding polymer is referred to as poly-meso-lactide (meso-PLA). Racemic batches (D/L-form molar ratio: 1:1; optically active) of lactic acid or lactide lead to polyesters which are referred to as poly-D,L-lactic acid or poly-D,L-lactide (PDLLA). Poly-L- and poly-D-lactic acid are semicrystalline polymers (poly-L-lactide crystallinity up to 40%) having glass transition temperatures ($T_g$) of about 55° C. to 70° C. (cf. G. B. Kharas, F. Sanchez-Riera and D. K. Severson "Polymers of Lactic Acid" in "Plastics from Microbes", David P. Mobley, Carl Hanser Verlag, Munich Vienna New York (1994) 93-137). The glass transition temperature $T_g$ is dependent on the water content. The melting temperature ($T_m$) of PLLA or PDLA is generally in the range from 170° C. to 180° C. Polymers of D,L-lactic acid have in principle amorphous properties. The melting enthalpy was measured for an enantiomeric PLA having a crystallinity of 100% at 93 J/g (cf. L. T. Lim, R. Auras and M. Rubino "Processing technologies for poly (lactic acid)" Progress in Polymer Science 2008, 33, (8), 820-852). Melting temperature and degree of crystallinity are dependent on the molar mass and the purity of the polymer (cf. K. Jamshidi, S.-H. Hydon and Y. Ikada "Thermal characterization of polylactide" Polymer 1988, 29, (12), 2229-2234). The optimum crystallization temperature of PLLA is 105° C.-115° C. (cf. D. Kaplan "Biopolymers from renewable resources" Springer Verlag: 1998, Ch. 15, M. H. Hartmann "High molecular weight polylactic acid polymers" 367-405). The process for crystallization is relatively slow, with a half-life of around 2.5 minutes. This half-life increases by up to 40% for each 1% meso-lactide present in the polymer.

Without wishing to be tied to a theory, the polylactic acids and polylactides form the so-called base polymer or backbone polymer of the adhesive mixture of the invention, meaning that they give the adhesive composition the necessary cohesion or internal strength. In contrast, the resins present in the adhesive composition of the invention are responsible for the permanent tack of the adhesive composition of the invention, with the polylactic acid-based or polylactide-based backbone polymer advantageously also possessing a certain inherent tack.

The bond strength of a PSA and the durability of an adhesive bond are dependent both on the adhesion of the adhesive to the substrates to be joined and on the internal strength of the adhesive, the cohesion. A PSA is generally formulated from a base polymer, as cohesion-determining component, and also from tacky resins and plasticizers, as adhesion-determining constituents, and optionally further adjuvants, as substances for development of specific properties.

The term "adhesion" for the purposes of the present invention refers to the adhering of the adhesive composition to the surface of one or more substrates. The term "cohesion" refers to the internal strength of the adhesive composition, i.e. the interactions between the molecules of the adhesive. A problem when formulating adhesive compositions is often that compounds, such as certain polymers, for example, possess either a high adhesion, i.e. a high bond strength, or a high cohesion, i.e. a high internal strength. Accordingly, the two critical components of PSAs are in general one or more tackifying resins, also called tackifiers, which ensure good adhesion but do not possess sufficient internal strength, and a base polymer or backbone polymer, which endows the adhesive composition with the necessary internal strength, but does not usually have the sufficient inherent tack required for PSAs.

In the context of the present invention, success has now been achieved for the first time in providing a base polymer or backbone polymer based on renewable raw materials.

The adhesive systems of the invention have an outstanding initial tack and additionally possess outstanding peel resistance and good thermal stability properties.

More particularly it is possible to coordinate the components of the adhesive system of the invention with one another in such a way that variably adjustable profiles of properties can be set. The adhesive system of the invention can therefore be tailored to the particular case of application.

The adhesive system of the invention, furthermore, can be utilized industrially, since lactic acid or polylactic acids and polylactides are available inexpensively in large quantities.

The adhesive system of the invention is suitable and can be made specifically compatible with a host of applications. With the adhesive composition of the invention, for example, it is possible to obtain adhesives for labels which are coated during the bonding operation, more particularly for the labelling of PET bottles.

Also possible, furthermore, is the bonding of impact sound insulation materials beneath laminate floors or wood floors. The adhesive system of the invention or the adhesive composition of the invention, moreover, may be used as an assembly aid for fixing in vehicle construction, more particularly, for example, for the fixing of sound-damping mats in car bodies.

The adhesive composition of the invention is equally suitable for assembly bonds in the construction sector, such as for adhesive-coated insulating foam panels or coated mounting devices for floor heating pipes, for example.

The adhesive composition of the invention is also suitable, moreover, for applications which are based traditionally on PSAs, such as, for example, the production of processed adhesive labels and adhesive tapes, such as adhesive tapes for the household and office sector, and also self-adhesive labels for industrial processing.

The use of renewable raw materials spares scarce resources such as crude oil. The use of very short-lived products based on raw materials of fossil kind, in comparison to materials used over the long term, leads specifically to accelerated emission of $CO_2$. This is reduced through the use of renewable raw materials. Apart from products in which natural rubbers are used as adhesives, there have to date been no hot-melt PSAs based on renewable raw materials.

As a result of the adhesive composition of the invention, based on renewable raw materials, it is also possible, in particular, by using plastics based on renewable raw materials, such as films based on polylactides, for example, to provide in totality products based on renewable raw materials. These products, furthermore, may also be of biodegradable design.

As far as the application of the adhesive composition of the invention to substrates is concerned, it may take place in a variety of ways. For example, the adhesive composition of the invention may be applied to the substrate or substrates by means of spraying, knife coating, rolling, calendering, printing processes, more particularly flexographic printing processes and/or screen printing processes, and/or by extrusion.

Particularly good processing properties and uniform application in defined layer thicknesses of the adhesive composition of the invention are possible more particularly when the adhesive composition of the invention is a hot-melt PSA composition. Prior to application to the substrate, accordingly, the adhesive composition of the invention is advantageously heated to temperatures which lie above the temperature of the actual joining operation, known as the processing temperature. By heating the hot-melt PSA composition of the invention prior to its application to the substrate, it is possible to adjust specifically the viscosity of the adhesive composition of the invention, and more particularly to tailor it precisely to the particular application method.

In the context of the present invention, particularly good results are obtained if the adhesive composition has a Brookfield viscosity at 140° C. in the range from 10 to 100 000 mPa·s, more particularly 20 to 80 000 mPa·s, preferably 50 to 60 000 mPa·s, very preferably 50 to 50 000 mPa·s. The adhesive composition of the invention is therefore outstandingly suitable for application from the melt, in which case it can be applied by a host of application possibilities.

A great advantage of the adhesive composition of the invention is that it is formed on the basis of renewable raw materials, thus enabling particularly sustainable production.

Renewable raw materials are raw materials on an organic basis—usually vegetable, animal or biogenic in origin—which are used for applications outside of the food and feed sectors, being used, more particularly, for energy generation or as materials. By energetic utilization is meant, typically, the recovery of energy for renewable raw materials, such as the combustion of biogas, for example. In the case of use as materials, the renewable raw materials are processed, for example, into basic chemicals, plastics, fibre substances, and also textiles and building materials. Since renewable raw materials come mostly from agricultural or forestry production, their use is generally accompanied by a good carbon dioxide balance or environmental balance, and hence allows particularly sustainable production. Attempts are increasingly being made, for this reason, to replace conventional materials, especially if based on petrochemical products, by materials based on renewable raw materials.

With regard to the fraction of renewable raw materials, it is preferable for the fraction of components based on renewable raw materials in the adhesive composition to be at least 30 wt %, more particularly at least 40 wt %, preferably at least 50 wt %, more preferably at least 60 wt %, very preferably at least 70 wt %, especially preferably at least 75 wt %, based on the total weight of the adhesive composition.

In the context of the present invention it is possible in particular to provide adhesive compositions which comprise components based on renewable raw materials in amounts of 30 to 100 wt %, more particularly 40 to 99.9 wt %, preferably 50 to 99.8 wt %, more preferably 60 to 99.7 wt %, very preferably 70 to 99.6 wt %, especially preferably 75 to 99.5 wt %, based on the total weight of the adhesive composition.

In order to obtain a product which is particularly sustainable overall, it is preferred in the context of the present invention if the total fraction of components based on renewable raw materials in the adhesive composition of the invention is particularly high. This means that not only the base polymer or backbone polymer based on polylactic acids or polylactides is based on renewable raw materials, but also, preferably, the other ingredients, such as, for example, resins, waxes, plasticizing agents (plasticizers) and optionally other adjuvants or additives present.

As far as the amounts of the individual components in the adhesive composition of the invention are concerned, they may vary within wide ranges.

Particularly good results are obtained in the context of the present invention, however, when the adhesive composition comprises the polymer (a) based on lactic acid in amounts of 5 to 85 wt %, more particularly 7.5 to 70 wt %, preferably 10 to 60 wt %, more preferably 12.5 to 55 wt %, very preferably 15 to 50 wt %, especially preferably 17.5 to 45 wt %, based on the adhesive composition.

Especially in aforementioned amounts, the polymer based on polylactic acids that is used in accordance with the invention gives the adhesive composition of the invention, as base polymer or backbone polymer, the necessary internal strength or cohesion, which for a utilizable adhesive must be sufficiently large. Surprisingly it has proved possible for the first time in the context of the present invention to provide a base polymer or backbone polymer based on lactic acid, despite polylactic acids and polylactides being particularly brittle plastics which the skilled person does not immediately associate with pressure-sensitive adhesives.

According to one preferred embodiment of the present invention, the adhesive composition of the invention comprises the resin in amounts of 5 to 70 wt %, more particularly 10 to 60 wt %, preferably 15 to 55 wt %, more preferably 17.5 to 50 wt %, very preferably 20 to 45 wt %. The resins used in accordance with the invention are typically tackifiers which give the adhesive composition of the invention a permanent surface tack. They possess a high adhesion, but only a low cohesion, and so pressure-sensitive adhesives generally cannot be produced solely on the basis of resins and/or waxes.

If the adhesive composition of the invention comprises a plasticizing agent or plasticizer, provision is typically made, in the context of the present invention, for the adhesive composition of the invention to comprise the plasticizing agent or plasticizer in amounts of 1 to 70 wt %, more particularly 2 to 60 wt %, preferably 3 to 50 wt %, more preferably 4 to 40 wt %, very preferably 5 to 35 wt %. Plasticizing agents or plasticizers permit precise adjustment of the rheological profile of the adhesive composition of the invention, and also increase the compatibility between base polymer or backbone polymer and resin and wax constituents. The plasticizers therefore permit precise adjustment of the rheological properties, more particularly the viscosity, of the adhesive composition of the invention on application, more particularly from the melt, and also in the processing state.

Particularly good results are obtained in the context of the present invention, however, if the adhesive composition of the invention comprises not only at least one resin but also at least one plasticizing agent or plasticizer, since in this way the physical properties of the adhesive composition of the invention can be adjusted specifically.

If the adhesive composition of the invention comprises a wax, then provision is generally made for the adhesive composition to comprise the wax in amounts of 0.1 to 70 wt %, more particularly 0.1 to 50 wt %, preferably 0.5 to 30 wt %, more preferably 0.5 to 20 wt %, very preferably 1 to 10 wt %, based on the composition.

As far, then, as the polymer (a) used in accordance with the invention and based on polylactic acid in the adhesive composition of the invention is concerned, it has proved to be advantageous if the polymer (a) based on polylactic acid comprises L-lactic acid units and/or D-lactic acid units. By lactic acid units are meant, in the context of the present invention, that the polylactic acids have been formed on the basis of L-lactic acid monomers and/or D-lactic acid monomers, or have been formed by the polymerization of such monomers. How the individual lactic acid monomers are polymerized, for example as random polymers or block (co)polymers, is of minor importance and is dependent on the intended applications properties of the adhesive composition.

In this context it has proved to be advantageous if the polymer (a) has a ratio of L-lactic acid units to D-lactic acid units in the range from 99:1 to 1:99, more particularly 98:2 to 10:90, preferably 95:5 to 20:80, more preferably 95:5 to 30:70, very preferably 90:10 to 40:60, especially preferably 85:15 to 50:50, even more preferably 85:15 to 60:40, more particularly preferably 85:15 to 70:30. It has emerged that in the aforementioned quantity ranges the polymer (a) exhibits improved viscosity and also toughness and inherent tack, especially as compared with pure poly L-lactic acid.

As far, then, as the nature of the polymer (a) used in accordance with the invention is concerned, furthermore, it has proved advantageous in the context of the present invention if the polymer (a) has sections and/or segments of lactic acid units. In the context of the present invention, accordingly, provision may be made for the polymer of the invention to consist exclusively of lactic acid units, i.e. polylactic acids and/or lactides. It is, however, equally possible, and often preferable, for the polymer (a) to have only segments and/or sections with lactic acid units, which are joined via other polymers or low molecular mass compounds, monomers for example, or are modified by such.

As far as the preparation of the individual segments and/or sections of lactic acid units, i.e. polylactic acids and/or polylactides, is concerned, then, it is possible generally to use all of the processes and methods known in the prior art. Thus, for example, it is possible to obtain suitable polylactic acids by condensation of mixtures of L-lactic acid and D-lactic acid in the respective molar proportions, with relatively high molecular weights being typically obtainable by polymerization or condensation in the presence of catalysts.

There are a multiplicity of catalysts that can be used for preparing the base polymers or backbone polymers used in accordance with the invention. Thus, for example, it is possible as catalysts to use titanium(IV) isopropoxide (Ti(iOPr)$_4$), titanium(IV) butoxide (Ti(OBu)$_4$), zinc chloride (ZnCl$_2$), zinc acetylacetonate (Zn(acac)$_2$), copper acetylacetonate (Cu(acac)$_2$), iron acetylacetonate (Fe(acac)$_3$), zirconium acetylacetonate (Zr(acac)$_4$), and also organic compounds such as phosphoric acid (H$_3$PO$_4$), sulphuric acid (H$_2$SO$_4$), succinic anhydride (SAA) and guanidine carbonate (Gu$_2$CO$_2$). Catalysts suitable are more particularly organozinc, organozirconium, organotitanium and organotin (II) compounds, more particularly zinc acetylacetonate, zirconium acetylacetonate, titanium butoxide, titanium isopropoxide and also tin(II) ethylhexanoate. Tin(II) catalysts have a very high catalytic activity and are highly soluble in organic solvents. However, they are cytotoxic and difficult to remove from the resulting polymers. Since approval for direct food contact is required for numerous applications of the base polymers or backbone polymers, tin-based catalysts cannot be used for these purposes.

As far as the amount of catalyst in the reaction mixture is concerned, it may vary within wide ranges. It is preferred, however, if the catalyst or catalysts is or are used in amounts of 0.05 to 5 wt %, more particularly 0.1 to 3 wt %, preferably 0.15 to 2 wt %, more preferably 0.2 up to 1.0 wt %, based on the amount of lactic acid or of polylactic acid that is used.

Another possibility for preparing the polymer (a) used in accordance with the invention and/or for preparing the lactic acid segments and/or sections of lactic acid units is to polymerize a corresponding mixture of L-lactic acid and D-lactic acid and then to subject the polymers obtained to post-condensation using a catalyst, thereby obtaining a chain extension.

In this context it has proved to be especially appropriate in the context of the present invention for the individual sections and/or segments of lactic acid units to have a number-average molar mass $M_n$ in the range from 300 to 10 000 g/mol, more particularly 400 to 8000 g/mol, preferably 500 to 7000 g/mol, more preferably 600 to 6000 g/mol, very preferably 700 to 5000 g/mol, especially preferably 750 to 4000 g/mol.

The molar masses reported for polymeric compounds in the context of this invention relate either to the number-average molar mass $M_n$ or to the weight-average molar mass $M_w$. In the case of the number-average molar mass $M_n$, the mass of the respective individual polymers is weighted by their numerical fraction, whereas in the case of the weight-average molar mass M, the mass of the individual polymeric compounds is weighted by their weight fraction. The molar masses and the molar mass distribution can be determined by various, standardized methods and techniques, such as, for example, by light scattering, rheology, mass spectrometry, permeation chromatography, etc. The methods used for determining the molar mass distribution are, however, familiar to the skilled person and require no more detailed elucidation. For instance, the molecular weights of the polymers used may be determined more particularly on the basis of a GPC method, more particularly on the basis of DIN 55672 using polymethyl methacrylate and/or polystyrene as standard.

According to one preferred embodiment of the present invention, the sections and/or segments of lactic acid units in the polymer (a) are connected to one another by ester functions and/or amide functions, preferably ester functions. The esterification or amidation in this context takes place preferably with use of catalysts, more particularly with use of the aforementioned catalysts.

In the context of the present invention it has proved to be appropriate if the ester functions and/or the amide functions are obtainable by reaction of oligomeric lactic acid with and/or by polymerization of lactic acid in the presence of alcohols and/or amines, more particularly polyols and/or polyamines, preferably alcohols, more particularly polyols. The reaction of the acid groups with the alcohols or amines produces lactic acid polymers which are terminated by the beta-hydroxyl functions of the lactic acid. These hydroxyl functions can be functionalized further in downstream reaction steps, for example. It is also possible, however, for the polylactic acids obtainable by reaction with polyols and/or polyamines to be used as the backbone polymer.

In this context provision may be made for the amines, more particularly polyamines, to be selected from the group of $C_2$-$C_{100}$ tetramines, $C_2$-$C_{100}$ triamines, $C_2$-$C_{100}$ diamines, more particularly $C_2$-$C_{50}$ tetramines, $C_2$-$C_{50}$ triamines, $C_2$-$C_{50}$ diamines, preferably $C_2$-$C_{20}$ tetramines, $C_2$-$C_{20}$ triamines, $C_2$-$C_{11}$ diamines, more preferably $C_2$-$C_{10}$ tetramines, $C_2$-$C_{10}$ triamines, $C_2$-$C_{10}$ diamines, and mixtures thereof. The amine groups here may alternatively be arranged at the ends or may be situated at any other desired location in the molecules, provided that they are amenable to a reaction.

Particularly good results are obtained in the context of the present invention if the alcohols, more particularly polyols, are selected from the group of polyethylene glycols (PEG), more particularly having a weight-average molecular weight $M_w$ in the range from 100 to 2000 g/mol, preferably 500 to 1000 g/mol, polypropylene glycols, more particularly having an average molecular weight $M_w$ in the range from 200 to 2000 g/mol, preferably 500 to 1000 g/mol, trimethylolpropane (TMP), pentaerythritol (Penta), dipentaerythritol (Dipenta), sorbitol, $C_2$-$C_{100}$ tetraols, $C_2$-$C_{100}$ triols and $C_2$-$C_{100}$ diols, more particularly $C_2$-$C_{50}$ tetraols, $C_2$-$C_{50}$ triols and $C_2$-$C_{50}$ diols, preferably $C_2$-$C_{11}$ tetraols, $C_2$-$C_{11}$ triols and $C_2$-$C_{11}$ diols, more preferably $C_2$-$C_{10}$ tetraols, $C_2$-$C_{10}$ triols and $C_2$-$C_{10}$ diols, and also mixtures thereof. In particular through the position of the hydroxyl functions in the polyalcohols and through the number thereof it is possible to set a specific degree of branching in the polymer (a) used in accordance with the invention.

The particular properties of PEG, such as the solubility in water and polar solvents and also the insolubility in non-polar solvents, high mobility and FDA approval, make them a suitable reaction partner for the preparation of block copolymers comprising lactic acid. The copolymers of lactic acid and PEG are more hydrophilic, more flexible and more biodegradable than pure polylactic acid. Through the incorporation of PEG into the PLA it is possible to influence the water-solubility of the resulting block copolymers and the molecular weight. Polymers with a low molecular weight or shorter PLLA blocks are soluble in water, while copolymers with a high molecular weight and copolymers with longer PLLA blocks form physically crosslinked hydrogels (cf. K. M. Huh and Y. H. Bae "Synthesis and characterization of polyethylene glycol)/poly(L-lactic acid) alternating multi-block copolymers" Polymer, 1999, 40, (22), 6147-6155). Polycondensation of PLA diols and PEG diacids produces multi-block copolymers having particular properties such as increased miscibility of the two components, low crystallinity and increased hydrophilicity (cf. W. J. Luo, S. M. Li, J. Z. Bei and S. G. Wang "Poly(L-lactide)-poly(ethylene glycol) Multiblock Copolymers: Synthesis and Properties" Chinese Chemical Letters 2002, 13, (1), 33-36).

Particularly good results are obtained in the context of the present invention if the alcohols are diols, more particularly selected from linear and/or branched, more particularly linear, $C_2$-$C_{20}$ diols, more particularly $C_2$-$C_{10}$ diols, preferably $C_2$-$C_8$ diols, more preferably $C_5$-$C_8$ diols.

Provision may further be made in this context for the diols to have one or two, preferably one, terminal hydroxyl function and/or for the diols to have vicinal hydroxyl functions. Thus, for example, in the context of the present invention, good results are obtained if 1,4-butanediol or 1,2-hexanediol are used as diols, it having emerged that the use of vicinal diols, such as 1,2-hexanediol, leads to polymers (a) which possess particularly good properties as a base polymer or backbone polymer.

In the context of the present invention, provision may also be made for the polymer (a) to be terminated by hydroxyl functions and/or by carboxylic acid functions.

Hydroxy-terminated polymers (a) are obtained, for example, by reacting polylactic acids with polyols, more particularly diols, or by polymerizing monomeric lactic acid, more particularly in a specific, preselected ratio of L-lactic acid to D-lactic acid, in the presence of polyols, more particularly diols. Carboxylic acid-terminated polymers (a) are obtained, for example, by reacting hydroxy-terminated polymers (a) with carboxylic anhydrides, such as succinic anhydride, for example. Equally, however, it is also possible to obtain carboxylic acid-terminated polymers (a) by polymerizing monomeric lactic acid, more particularly in a pre-specified ratio of L-lactic acid to D-lactic acid, in the presence of carboxylic anhydrides.

The hydroxyl-terminated or carboxylic acid-terminated polymers obtained in this way can be used directly as a base polymer or backbone polymer in the adhesive composition of the invention, though it is also possible to subject these polymers to further reaction and/or modification.

Often an increase in the molar masses of low molecular mass oligomers and polymers of lactic acid is necessary or desirable. This can be achieved by means of a variety of methods. Thus, for example, the molar masses may be increased by transesterification. Reaction with diisocyanates as well may lead to chain extension and therefore to higher molar masses. With regard to monomer distribution, a distinction is made between random and non-random copolymers. Random copolymers are characterized by a chance arrangement of the monomers in the polymer chain. Copolymers or block copolymers with non-random distribution are characterized by ordered regions of monomer units in the polymer chain. The properties of random copolymers are determined primarily by the composition of the comonomers, particularly with regard to structure and concentration, and by the molar masses.

As far as the further functionalization or reaction of polymers with lactic acid units is concerned, it may take place in a variety of ways. Particularly good results, however, are obtained in the context of the present invention if the polymer (a), more particularly subsequent to the sections and/or segments of lactic acid units, more particularly for chain extension, has modifications by chemical groups. Through further chemical modification of the lactic acid-containing polymers it is possible to adjust their properties as a base polymer or backbone polymer in pressure-sensitive adhesive compositions individually for any of a very wide variety of applications.

According to one preferred embodiment of the present invention, the polymer (a) has chemical modifications by chemical groups, on the basis of chemical groups and/or units and/or sections and/or segments, more particularly selected from (i) polyethers, polyesters, polyamides and/or
(ii) urethanes, polyurethanes and/or
(iii) polyacrylates, polymethacrylates, polystyrenes, acrylic/styrene copolymers, styrene copolymers, polyvinyl acetates, polyolefins, more particularly atactic polypropylene, and also mixtures and co- and terpolymers thereof. The modification with chemical groups and/or polymers may be accomplished by reaction of the compounds or the polymer to be introduced with the lactic acid-containing polymer parent structure that is present, though it may also be achieved through the construction of a further polymer unit on the lactic acid-containing polymer parent structure.

If the polymer (a) of the invention has chemical modifications by polyethers, polyesters, polyamides and/also mixtures thereof and/or co- and terpolymers thereof, then it has proved to be advantageous if they have a weight-average molecular weight $M_w$ in the range from 200 to 10 000 g/mol, more particularly 300 to 9000 g/mol, preferably 400 to 8000 g/mol, more preferably 500 to 7000 g/mol, very preferably 750 to 6500 g/mol, especially preferably 1000 to 6000 g/mol. Modification with polymers in the stated molecular weight range leads to base polymers or backbone polymers (a) having particularly advantageous properties.

If the polymer (a) used in accordance with the invention has a chemical modification by urethanes and/or polyurethanes, then in this case it has proved to be advantageous if they have a weight-average molecular weight $M_w$ in the range from 150 to 10 000 g/mol, more particularly 200 to 8000 g/mol, preferably 250 to 7000 g/mol, more preferably 500 to 5000 g/mol, very preferably 750 to 3000 g/mol, especially preferably 1000 to 2000 g/mol. In this context, especially in the event that diisocyanates are used as modifiers for preparing the urethanes, it may be possible for them to have a molecular weight in the range from 150 to 1000 g/mol, more particularly 150 to 750 g/mol, preferably 150 to 500 g/mol, more preferably 150 to 300 g/mol. A modification with urethane groups may be accomplished, for example, by reaction of hydroxy-terminated, lactic acid-containing polymers with monomeric diisocyanates, as a result of which the lactic acid-containing, hydroxy-terminated polymers are coupled via urethane groups, thereby achieving an increase in the molecular weight and a chain extension.

In the event that the polymer (a) used in accordance with the invention has polyacrylates, polymethacrylates, polystyrenes, acrylic/styrene copolymers, polyvinyl acetates and also mixtures thereof and/or co- and terpolymers thereof, particularly good results are obtained if they have a weight-average molecular weight $M_w$ in the range from 200 to 20 000 g/mol, more particularly 500 to 15 000 g/mol, preferably 750 to 10 000 g/mol, more preferably 1000 to 9000 g/mol, very preferably 2500 to 8000 g/mol, especially preferably 5000 to 7000 g/mol. The aforementioned polymers may be attached via a multiplicity of chemical functionalities to the lactic acid-containing polymer parent structure, more particularly through reaction of epoxy functions.

As far as the aforementioned chemical modifications and polymers are concerned, their properties and molecular construction can be varied within wide ranges, and so base polymers or backbone polymers especially tailored to the particular end use are obtainable.

If, however, the polymer (a) has a chemical modification by polyethers, then particularly good results in the context of the present invention are obtained if the polyethers are selected from polyglycols, more particularly polyethylene glycol and polypropylene glycol.

If, on the other hand, the polymer (a) has polyester units, then particularly good results are obtained if the polyesters are selected from polyethylene terephthalate, polybutylene terephthalate, poly-carbonate, polyethylene naphthalate and mixtures thereof and also co- and terpolymers thereof.

If polyamides are selected as chemical modification for the polymer (a), then it has proved appropriate if the polyamides are selected from the group of polycaprolactam, poly-N,N'-hexamethyleneadipamide, polyhexamethylenesebacamide, polyhexamethylenedodecane-diamide, polyundecanolactam, polylauryllactam and mixtures thereof and also co- and terpolymers thereof.

According to one preferred embodiment of the present invention, the urethanes are obtainable by reaction of isocyanates, more particularly monomeric isocyanates, with hydroxyl functions of a prepolymer of the polymer (a). These prepolymers may be, for example, hydroxy-terminated variants of the polymer (a), which all consist of lactic acid segments connected via ester functions. In this context provision may be made for the isocyanates to be selected from the group of toluene diisocyanate (TDI), diphenylmethane diisocyanate (MDI), polymeric diphenylmethane diisocyanate (pMDI), hexamethylene diisocyanate (HMDI), isophorone diisocyanate (IPDI), 4,4'-diisocyanato-dicyclohexylmethane (H12MDI) and/or isocyanate-terminated prepolymers based on these isocyanates. Alternatively, however, provision may also be made for polymers based on polyurethanes to be used, more particularly thermoplastic polyurethanes (TPU). Preference in the context of the present invention is given to using asymmetric diisocyanates, such as 2,4'-diphenylmethane diisocyanate, for example, for further polymerization and/or chain extension of the lactic acid-containing polymer (a).

In the context of the present invention it is therefore preferred for the polymer (a), more particularly subsequent to the sections and/or segments of lactic acid units, more particularly for chain extension, to have modifications by chemical groups selected from polyethers, polyesters, urethanes, polyurethanes and also reaction products and co- and terpolymers thereof, more particularly a modification with polyethers and/or urethanes. With the aforesaid chemical modifications it has to date been possible to prepare base polymers or backbone polymers, for PSA compositions, that are particularly universal in their usefulness.

Particularly good results are obtained in the context of the present invention especially when the polymer (a) has
(I) L-lactic acid and/or D-lactic acid units, preferably L-lactic acid and D-lactic acid units, and/or
(II) terminal hydroxyl and/or carboxylic acid functions and/or carboxylic esters and/or carboxamides and/or
(III) polyether groups and/or polyether units and/or
(IV) urethane groups and/or urethane units and/or polyurethane groups and/or polyurethane units and/or
(V) polyacrylate groups and/or polyacrylate units.

According to one preferred embodiment of the present invention, the polymer (a) has a modification with urethane groups, and particularly good results are obtained if the polymer (a) is a polyester urethane. For other preferred possibilities for the preparation of polyester urethanes suitable for the adhesive composition of the invention, reference is made to the contemporaneously filed German patent application of the Fraunhofer Gesellschaft zur Forderung der angewandten Forschung e.V., Munich, Germany, and of the Westfälische Hochschule, Gelsenkirchen, Bocholt, Recklinghausen, Germany.

As regards the molecular weight of the polymer (a), it may vary within wide ranges. Generally speaking, the polymer (a) has a weight-average molar mass $M_w$ in the range from 300 to 150 000 g/mol, more particularly 500 to 100 000 g/mol, preferably 750 to 90 000 g/mol, more preferably 1000 to 80 000 g/mol, very preferably 5000 to 75 000 g/mol, especially preferably 10 000 to 70 000 g/mol. Polymers (a) having the aforementioned molecular weights are especially suitable as base polymers or backbone polymers for PSA compositions, being suitable for endowing the adhesive composition with the necessary internal strength or cohesion.

As concerns, also, the polydispersity of the polymers (a) used in accordance with the invention, it too may vary within wide ranges. Particularly good results, however, are obtained if the polymer (a) has a polydispersity $M_w/M_n$ in the range from 1.0 to 9, more particularly 1.3 to 8, preferably 1.5 to 7, more preferably 1.7 to 6, very preferably 1.9 to 5.5, especially preferably 1.9 to 5. It has emerged that particularly highly performing base polymers or backbone polymers are obtained especially when the polydispersity of the polymer is particularly high. In the context of the present invention, accordingly, polymers (a) having a particularly broad molar mass distribution are employed with preference. These molecules are capable more particularly of providing a certain inherent tack and also toughness and, furthermore, of endowing the resultant adhesive composition with the necessary cohesion.

As observed above, the adhesive composition of the invention may comprise at least one resin. In this context it has been found appropriate if the resin is selected from the group of hydrocarbon resins, more particularly aliphatic, cyclic or cycloaliphatic hydrocarbon resins, optionally modified rosins, terpene resins, terpene-phenolic resins, polyester polyol resins, polyurethane resins, coumarone-indene resins, α-methylstyrene resins, tall resins, polymerized tall resin esters and/or ketone-aldehyde resins, preferably terpene resins, polyester polyol resins and/or polyurethane resins, and also mixtures thereof. The aforementioned resins are compatible with a multiplicity of base polymers or backbone polymers based on lactic acid and can be mixed in wide ranges, thereby making a large multiplicity available of PSA compositions specifically tailored to the particular end use.

If the adhesive composition of the invention comprises a wax, this wax is preferably selected from polyolefin waxes, such as polyethylene and polypropylene waxes, waxes based on renewable raw materials, such as sugarcane wax and hydrogenated castor waxes, and waxes modified on this basis.

If the adhesive composition of the invention comprises a plasticizing agent (plasticizer), particularly good results are obtained if the plasticizing agent (plasticizer) is selected from the group of polyglycols, more particularly polyethylene glycol and/or polypropylene glycol, glycerol, citrate and citrate derivatives, more particularly citric esters, and also mixtures thereof.

According to one preferred embodiment of the present invention the adhesive composition of the invention, as well as the stated components, further comprises at least one adhesive.

These additives may be conventional adjuvants, such as high-boiling organic oils, esters or other additives serving for plasticizing, stabilizers, more particularly UV stabilizers, antioxidants, acid scavengers, fillers, more particularly nanoparticulate or microscale fillers, and/or aging inhibitors. The additives are employed more particularly for rounding out the applications profile of the adhesive composition of the invention, particularly in relation to shelf life and also to the duration and strength of the bonds. Using the additives, furthermore, it is also possible to specifically influence and adjust the rheology and therefore the application behaviour of the adhesives of the invention.

The adhesive composition of the invention may in particular comprise antioxidants, in order to prevent or at least reduce the disadvantages associated with degradation processes in the course of the processing and the use of the adhesive composition. Depending on the mechanism of action, a distinction is made between primary (radical scavengers) and secondary (peroxide destroyers) antioxidants. The former include sterically hindered phenols, secondary, aromatic amines; the others include phosphites, phosphonites, thioethers, carbodiimides and zinc dibutyldithiocarbamate. The advantage of using mixtures is evident from the different mechanisms of action. From the multiplicity of the phosphorus compounds, organic phosphinic acid derivatives, phosphites and phosphonates are of interest as stabilizers. Unspecific thermooxidative and hydrolytic degradation reactions, preferably during the deformation of these aliphatic polyesters, are inhibited by organic phosphorus compounds (thermooxidation) or water-binding additives (hydrolysis), such as carbodiimides, activated acid derivatives or isocyanates. Antioxidants used for inhibiting the degradation are the time-honoured phosphites and/or sterically hindered phenols.

As far as the amounts in which the adhesive composition of the invention comprises the additive are concerned, they may vary within wide ranges. Generally speaking, the adhesive composition comprises the additive in amounts of 0.01 to 10 wt %, more particularly 0.01 to 8 wt %, preferably 0.05 to 7 wt %, more preferably 0.05 to 6 wt %, very preferably 0.1 to 5 wt %.

With regard, now, to the bond strength of the adhesive composition of the invention, more particularly PSA composition, it may equally vary within wide ranges. In particular, however, it is possible in the context of the present invention to compile PSA compositions which are adapted individually to the particular end use. This may relate on the one hand to the labelling of PET bottles; also, however, semi-structural applications may equally be envisaged, such as the attachment of insulating panels for the exterior insulation of basements, or as an assembly aid in vehicle construction, for example.

Generally speaking, the adhesive composition of the invention has a peel strength, determined according to FTM 1, in the range from 1 to 50 N/25 mm, more particularly 2 to 40 N/25 mm, preferably 3 to 35 N/25 mm, more preferably 4 to 30 N/25 mm, very preferably 5 to 25 N/25 mm. The adhesive composition of the invention therefore has a bond strength which is suitable for a multiplicity of applications.

Furthermore, the adhesive composition of the invention generally has a surface tack (Loop Tack), determined according to FTM 9, in the range from 1 to 50 N/25 mm, more particularly 3 to 40 N/25 mm, preferably 4 to 35 N/25 mm, more preferably 5 to 30 N/25 mm, very preferably 6 to 25 N/25 mm. The adhesive composition of the invention therefore also has outstanding initial tack values, so making it suitable for a multiplicity of applications.

Generally speaking, the adhesive composition of the invention has a thermal stability (shear adhesion failure temperature; SAFT), determined according to ASTM D4998-07, in the range from 30 to 160° C., more particularly 35 to 150° C., preferably 40 to 140° C., more preferably 50 to 130° C.

Further provided by the present invention—according to a second aspect of the present invention—is a method of joining at least two substrates by adhesive bonding, in which an adhesive composition as described above is applied to at least one, preferably one, of the substrates and subsequently the substrates are assembled below the processing temperature. The method of the invention enables substrates to be bonded by means of adhesives based on renewable raw materials, more particularly pressure-sensitive adhesives based on renewable raw materials, with results comparable to those obtained with petrochemical-based adhesives.

In the context of the methodology of the invention it is possible for the adhesive composition to be applied continuously or discontinuously to the substrate. By continuous application of the adhesive composition to the substrate is meant a uniform and consistent application of the adhesive. Discontinuous application of the adhesive composition to the substrate, in contrast, is—for example—a dotwise or patterned application of the adhesive.

In this context, provision may be made for the substrate to be coated with the adhesive composition. Coating constitutes a uniform and usually full-area application of the adhesive to the joining surface of the substrate.

This coating may take place in such a way as to produce a coherent or continuous layer of adhesive, or an interrupted or non-continuous layer of adhesive. The particular application scenario dictates which kind of application of the layer of adhesive is preferred, but preference generally is given to consistent and full-area coating of the substrate or of the intended joining surfaces, since this leads to improved force transmission.

The method of the invention makes it possible in general for the substrates to be connected permanently and/or reversibly, preferably permanently. In combination with the adhesive composition of the invention, the methodology of the invention permits an alternatively permanent or reversible, i.e. releasable, bonding of the substrates. For many applications, however, a permanent bonding is preferred, since it entails a higher bond strength.

As far as the temperatures at which the adhesive composition is applied to the substrate or substrates are concerned, they may vary within wide ranges. In the context of the present invention, however, it has proved to be advantageous if the adhesive composition is applied from the melt, more particularly at temperatures in the range from 80 to 250° C., more particularly 90 to 200° C., preferably 100 to 180° C.

The temperature at which the adhesive composition is applied to the substrate corresponds here to the processing temperature. One particular feature of the method of the invention can be seen, then, in the fact that the actual joining operation, owing to the in principle infinitely open time, may take place at temperatures below the processing temperature, including, in particular, at room temperature.

In the context of the method of the invention, the adhesive composition of the invention is applied from the melt or in a state of reduced viscosity to the substrate, and by this means it is possible to achieve a particularly low-profile and uniform application of the adhesive to the substrate.

With regard to the application of the adhesive composition to the substrate or substrates as part of the methodology of the invention, it may take place by any suitable means. It has emerged, however, that particularly good results are obtained if the adhesive composition of the invention is applied to the substrate by means of spraying, knife coating, rolling, calendering, printing processes, more particularly by means of flexographic printing processes or screen printing processes, and/or extrusion. Through these application processes it is possible to achieve a particularly uniform and flexibly adjustable layer of adhesive.

The amount of the adhesive applied to the substrate as well may vary within wide ranges according to the specific application. Here as well, however, it has been found appropriate for the adhesive composition to be applied with a coatweight of 5 to 250 g/m$^2$, more particularly 8 to 100 g/m$^2$, preferably 10 to 50 g/m$^2$, to the substrate.

With regard to the actual joining operation, the procedure in accordance with the invention is that the joining operation takes place in general under pressure and/or with pressing.

In this context it is possible for the pressure or the pressing to be maintained for a duration of 0.001 to 100 seconds, more particularly 0.002 to 80 seconds, preferably 0.005 to 70 seconds, more preferably 0.008 to 60 seconds, very preferably 0.01 to 50 seconds.

The method of the invention is suitable for bonding a multiplicity of different materials. Thus, for example, provision may be made in accordance with the invention for at least one substrate to comprise wood and/or paper, and more particularly to consist at least predominantly thereof.

Alternatively or cumulatively, however, it is also possible for at least one substrate to comprise plastic, leather and/or metal, more particularly to consist at least predominantly thereof.

Equally, however, it is also possible for at least one substrate to comprise stone and/or concrete, more particularly to consist at least predominantly thereof.

In the context of the methodology of the invention, provision is made more particularly for different materials to be bonded to one another, such as, for example, paper labels to PET bottles, impact sound insulation to the concrete underfloor and/or to wood-based materials, or else plastic insulating panels to the metal parts of car bodies.

For further details of the method of the invention, reference may be made to the above observations concerning the adhesive composition of the invention, which apply correspondingly in relation to the method of the invention.

Additionally provided with the present invention—according to a third aspect of the present invention—is the use of an above-described adhesive composition for the lamination of plastics, more particularly for attaching labels to plastic bottles, preferably PET bottles.

In the case where the adhesive compositions of the invention are used to laminate plastics, more particularly to label plastic bottles, particularly good results are obtained if the adhesive composition of the invention has a peel strength, determined according to FTM 1, in the range from 1 to 50 N/25 mm, more particularly 2 to 40 N/25 mm, preferably 2 to 35 N/25 mm, more preferably 3 to 30 N/25 mm, very preferably 3 to 28 N/25 mm, especially preferably 4 to 27 N/25 mm.

Furthermore, provision may be made for the adhesive composition of the invention in this context to have a surface tack (Loop Tack), determined according to FTM 9, in the range from 1 to 50 N/25 mm, more particularly 2 to 40 N/25 mm, preferably 2 to 30 N/25 mm, more preferably 3 to 27 N/25 mm, very preferably 3 to 24 N/25 mm and especially preferably 4 to 22 N/25 mm.

In accordance with one particular embodiment of the present invention, the adhesive system of the invention in its use for laminating plastics, more particularly for labelling plastic bottles, has a thermal stability (SAFT) of 30 to 90° C., more particularly 35 to 80° C.

Particularly good and durable bonds are obtained here if the adhesive system of the invention has a viscosity of 200 to 2000 mPa·s, more particularly 220 to 1800 mPa·s, preferably 250 to 1500 mPa·s, more preferably 280 to 1300 mPa·s, more preferably 300 to 1100 mPa·s, at 140° C.

Adhesive systems having the aforementioned properties are particularly suitable for the lamination of plastic bottles, more particularly the labelling of plastic bottles, since on the one hand the bond is stable and permanent enough to prevent detachment of the label, and on the other hand the bond is elastic enough to be able to conform to slight changes in the external shape of the plastic substrate. Such changes of shape on the part of the plastic substrate may arise, for example, in the case of plastic bottles, through evolution of $CO_2$ under pressure.

Accordingly, in the inline labelling of PET bottles, a variety of requirements are imposed on the adhesive. One factor concerns the expansion of a PET bottle when exposed to elevated temperatures. This effect is intensified by the filling of carbonated drinks. If the adhesive used has inadequate elasticity and inadequate heat stability, then the label would tear or there would be cohesive fraction of the adhesive. Nevertheless, the adhesive is required to exhibit effective adhesion to the substrates (see Loop Tack and glass transition temperature) even at low temperatures (e.g. on storage in a refrigerator). Account must also be taken of the fact that the adhesive may be exposed to moisture as a result, for example, of condensation of atmospheric humidity.

There are, furthermore, different label materials and therefore differing requirements concerning the adhesive. In the case of paper labelling, absence of strikethrough is very important for visual reasons. In the case of labelling with polymeric labels, in contrast, the focus is on the adhesion to the difficult PE and PP substrates. Where the labels are transparent, the colour of the adhesive plays another large part.

Since the field involved is that of the packaging of comestibles, an extremely low odour and the approval of the adhesive for food contact, both in accordance with the FDA (Food and Drug Administration) and the EU directives, are mandatory requirements.

For more in-depth details concerning the use according to the invention, reference may be made to the above observations concerning the other aspects of the invention, which apply correspondingly in relation to the use according to the invention.

A further provision by the present invention in turn—according to a fourth aspect of the present invention—is the use of an above-described adhesive composition for the adhesive bonding of sheet-like materials to planar substrates, more particularly to wood substrates and/or plastics substrates, preferably for the adhesive bonding of impact sound insulation, more particularly for laminate floors and/or wood floors.

If the adhesive composition of the invention is used for the adhesive bonding of sheet-like materials to planar substrates, more particularly to wood substrates and/or plastics substrates, the adhesive composition of the invention generally has a peel strength of 1 to 50 N/25 mm, more particularly 2 to 45 N/25 mm, preferably 3 to 40 N/25 mm, more preferably 4 to 35 N/25 mm, very preferably 5 to 30 N/25 mm.

Particularly good results in the bonding of sheet-like materials to planar substrates are obtained more particularly when the composition of the invention has a surface tack (Loop Tack) in the range from 1 to 50 N/25 mm, more particularly 2 to 40 N/25 mm, preferably 4 to 30 N/25 mm, more preferably 6 to 27 N/25 mm, very preferably 7 to 25 N/25 mm.

Furthermore, provision may be made for the adhesive composition of the invention in this context to have a thermal stability (SAFT) in the range from 30 to 130° C., more particularly 40 to 125° C., preferably 45 to 120° C., more preferably 50 to 120° C.

As far as the viscosity of the inventive adhesive composition is concerned during application in the context of its use for the bonding of sheet-like materials to planar substrates, particularly good results are obtained if in the case of application using nozzles, the adhesive composition of the invention has a Brookfield viscosity of 300 to 2500 mPa·s, more particularly 600 to 2300 mPa·s, preferably 700 to 2000 mPa·s, more preferably 750 to 1700 mPa·s, very preferably 800 to 1500 mPa·s, at 140° C. If, however, the adhesive composition of the invention is applied using a roll, it has been found appropriate for the adhesive composition of the invention to have a Brookfield viscosity of 5000 to 40 000 mPa·s, more particularly 6000 to 35 000 mPa·s, preferably 7000 to 30 000 mPa·s, more preferably 8000 to 27 000 mPa·s, very preferably 9000 to 25 000 mPa·s, at 180° C.

When adhesive compositions having the aforementioned properties are used, the adhesive outcomes achieved in the context of the present invention are particularly good and permanent in the context of the bonding of sheet-like materials to planar substrates, more particularly to wood substrates and plastics substrates, preferably for the bonding of impact sound insulation to laminate floors and/or wood floors.

The most important requirement imposed on the adhesive for the bonding of impact sound insulation beneath laminate floors lies in the broad adhesion spectrum the adhesive is required to have. The reason for this is the multiplicity of insulating materials that are employed in this segment, such as recycled mats, cork or wood fibre mats.

Depending on the insulating material, the method and the recyclability requirement (separation of laminate floor and insulating material), the quantity of adhesive applied may vary greatly. In general between 5 and 250 $g/m^2$, more particularly 10 to 200 $g/m^2$, preferably 15 and 150 $g/m^2$, are applied.

The adhesives may be divided according to the system of application, a distinction being made in principle between two procedures: the laminate floor and the impact sound insulation are joined as part of the production process, or else one of the two substrates is given a self-adhesive treatment and is joined to the second substrate in situ on the construction site.

Where joining takes place in situ, the temperature is important, since in this case it is easily possible for low temperatures to prevail. If the adhesive has too high a glass transition temperature, sufficient adhesion may not be achieved at low temperatures. On the other hand, as a result of insolation, for example, the bond may also be exposed to relatively high temperatures. Whether the cohesion of the adhesive is sufficient for this can be ascertained by determination of the SAFT value. In addition, the adhesive must exhibit a certain plasticizer resistance, since the insulating materials may include plasticizers.

Other important properties when selecting the adhesive are the viscosity that is suitable for the application system, and a high inherent tack (Loop Tack). A further requirement is a high elasticity, in order to support the objective of the application, namely the improvement of the interior acoustics.

Generally speaking, the adhesive composition, in the system under consideration at this point, is required to meet the demands of diverse fields of use. Frequently, materials such as nonwovens are treated self-adhesively and then used for heat or sound insulation or cushioning. Other materials as well, however, may be treated self-adhesively and therefore bonded in situ. In this case the adhesive frequently takes on the function of an assembly aid. The final fixing then takes place subsequently by different methods (mechanically, for example). Since bonding in that case takes place generally at a temperature which lies well below the application temperature, the adhesive must have a high inherent tack (Loop Tack) in order to ensure effective wetting of the substrate. Adhesives of relatively high viscosity are employed here, since the insulating and proofing materials are generally porous or open-pored systems. A low-viscosity adhesive would be lost into the substrate. At the same time, an adhesive with high elasticity is required, which assists the damping function.

The areas of application therefore range from car making and mechanical engineering through to house construction and furniture building. Since the adhesive, therefore, is also used in exterior applications, it is required to exhibit an extremely broad temperature spectrum in terms of its deployment temperature, and also a high level of resistance with respect to moisture. For the automotive sector, moreover, great importance attaches to odour neutrality and to low values for VOC (Volatile Organic Compound) and fogging.

For more in-depth details concerning this aspect of the invention, reference may be made to the above observations concerning the other aspects of the invention, which apply correspondingly in relation to the use according to the invention.

Additionally provided with the present invention in turn—according to a fifth aspect of the present invention—is the use of an above-described adhesive composition as an assembly aid, more particularly during the production of vehicles, preferably during the production of motor vehicles, more preferably during the fixing of sound insulating panels in motor vehicle bodies.

If the adhesive composition of the invention is used as an assembly aid, more particularly in the production of vehicles, or for assembly bonds in the construction industry, particularly good results are obtained if the adhesive composition of the invention has a peel strength of 5 to 50 N/25 mm, more particularly 6 to 45 N/25 mm, preferably 7 to 40 N/25 mm, more preferably 8 to 35 N/25 mm, very preferably 10 to 30 N/25 mm.

In general the adhesive compositions employed for these purposes have a surface tack (Loop Tack) in the range from 5 to 60 N/25 mm, more particularly 6 to 55 N/25 mm, preferably 7 to 50 N/25 mm, more preferably 8 to 45 N/25 mm, very preferably 10 to 40 N/25 mm.

Provision may further be made for the adhesive composition of the invention to have a thermal stability (SAFT) in the range from 40 to 150° C., more particularly 45 to 130° C., preferably 50 to 125° C., more preferably 55 to 120° C., very preferably 60 to 115° C.

If the adhesive composition of the invention is used as an assembly aid or for assembly bonds in the construction sector, the adhesive composition of the invention generally has a viscosity of 5000 to 85 000 mPa·s, more particularly 6000 to 80 000 mPa·s, preferably 7000 to 75 000 mPa·s, more preferably 8000 to 70 000 mPa·s, very preferably 9000 to 65 000 mPa·s, especially preferably 10 000 to 60 000 mPa·s, at 160° C.

If adhesive compositions having the aforementioned profile of properties are used as an assembly aid or for assembly bonds in the construction sector, particularly stable bonds are achieved.

For more in-depth details concerning this aspect of the invention, reference may be made to the above observations concerning the other aspects of the invention, which apply correspondingly in relation to the use according to the invention.

Lastly, the present invention further provides—according to a sixth aspect of the present invention—the use of an aforementioned adhesive composition for assembly bonds in the construction industry. Provision may be made more particularly in this context for the adhesive composition of the invention to be used for the coating of insulating panels for the exterior insulation of basements. The adhesive composition of the invention is equally suitable, according to a preferred embodiment, for coated mounting devices for floor heating pipes.

For more in-depth details concerning this aspect of the invention, reference may be made to the above observations concerning the other aspects of the invention, which apply correspondingly in relation to the use according to the invention. Further embodiments, modifications, variations and peculiarities of the present invention are readily apparent and realizable to the skilled person on reading the description, without departing from the scope of the present invention.

The present invention is illustrated by the following examples which follow, but the present invention is not restricted to these examples.

EXAMPLES

1. Analytical Methods

Fourier Transform Infrared Spectroscopy (FTIR Spectroscopy)

The samples are analyzed on a Vector 22 Fourier transform infrared (FTIR) spectrometer from Bruker Analytik GmbH.

Differential Scanning Calorimetry (DSC)

The measurements are carried out using a DSC 204 Phoenix DSC instrument from Netzsch Gerätebau GmbH, under a gentle stream of nitrogen. The dynamic measurement range lies between +/−0.01 and +/−100 mW. Sample holders used were aluminium boats. All of the specimens produced were subjected to the following measurement programme:

1st heating: from 20° C. to 160° C.; heating rate: 20 K/min isotherm at 160° C.: 2 min
Cooling: from 160° C. to −60° C.; cooling rate: 20 K/min isotherm at −60° C.: 2 min
2nd heating: from −60° C. to 220° C.; heating rate: 10 K/min
Gel Permeation Chromatography (GPC)

The molar masses of the polymer samples and their molar mass distributions are determined by means of gel permeation chromatography (GPC).

Eluent hexafluoroisopropanol (HFIP) with 0.05 M potassium trifluoroacetate (KTFAc)
Columns PSS-PFG, 7 µm particle size, 1000 Å, 8.0×300 mm
  PSS-PFG, 7 µm particle size, 300 Å, 8.0×300 mm
  PSS-PFG, 7 µm particle size, 100 Å, 8.0×300 mm
Pump isocratic pump (Agilent 1100 series)
Flow rate 1.0 ml/min
Injection system applicator with 100 µl injection volume (Agilent 1100 series)
Temperature 25° C. (column oven)
Detector SECcurity diode array detector (DAD) (Agilent 1260 series)
  Refractive index detector (RI) (Agilent 1100 series)
  PSS SLD 7000 light scattering photometer (LS) (Brookhaven Instrument Inc.)
  SECcurity GPC viscosity detector ETA-2010
Temperature 35° C. (optical measuring cell)
Analysis WinGPC® Unity (Version 7.5.0)

The system was calibrated using narrow-range polymethyl methacrylate standards (PMMA) in the separating range of the column combination. The samples were analyzed using the strip method with computer assistance on the basis of the PMMA calibration.

Dynamic Mechanical Analysis (DMA)

The measurements were carried out by the oscillation method using a BOHLIN CVO120 rheometer with a plate/plate measuring system (diameter=25 mm). All of the specimens produced were subjected to the following measurement programme:

Controlled deformation: 100%;
T ramp: at least 130° C. to at least −10° C.;
Cooling rate: 5 K/min.

2. Synthesis of the Base or Backbone Polymers
2.1. Synthesis of Backbone Polymers Based on L-Lactic Acid, Using Catalysts
2.1.1. General Operating Specifications The operating specification below serves as a template for all of the experiments carried out on the synthesis of lactic acids, unless different reaction conditions are stated.

For the synthesis of polylactic acid by polycondensation, commercial 80% strength L-lactic acid was used. The lactic acid polycondensations were carried out as polycondensation in the melt. The preparation process ran in two stages: dewatering and polycondensation.

Dewatering of the Lactic Acid:

An amount of commercial lactic acid equivalent to 100 g of anhydrous lactic acid was dewatered under reduced pressure via a distillation bridge at 130° C. for 2 hours. To prevent the removal of lactic acid, a Vigreux column was employed between the reservoir flask and the distillation bridge. To monitor the removal of water, the refractive index of each distillate was measured.

Polymer Preparation:

After the dewatering phase, the oil bath temperature was raised and the catalyst was added. Then the polycondensation was carried out under reduced pressure (3-10 mbar). The refractive index of the distillate (water of reaction) was likewise measured. The product was a slightly viscous, pale yellow material with a woody odour.

Purification of the Polylactic Acid:

The resulting polymer was dissolved in chloroform and precipitated from 10 times the amount of ice-cooled methanol. The purified PLA was filtered and dried to constant mass in a vacuum drying cabinet (60° C.)

Characterization of the Polymer Samples:

The polymer samples prepared were characterized prior to extraction (these samples are referred to as "crude product") and after extraction (referred to as "purified") by means of GPC, DSC and TG. In addition the yield of the crude product and of the purified samples was calculated.

2.1.2. Synthesis of Homopolyester of Lactic Acid by Direct Polycondensation (DP)

Catalyst Selection

Inorganic compounds of tin(II), of titanium, of sodium, of potassium, of iron, of zinc and of zirconium, and also protic acids (p-toluenesulphonic acid, sulphuric acid, phosphoric acid) and other organic compounds such as succinic anhydride, guanidine dicarbonate ($Gu_2CO_3$) and TBD (1,5,7-triazabicyclo[4.4.0]dec-5-ene) were tested as catalysts.

The experiments were carried out both with L-lactic acid (also called L-LA below) and with oligo-L-lactic acid (also called OLA below). The oligomeric lactic acid was prepared over 8 hours (h) at 150° C. (2 h under nitrogen atmosphere and 6 h under reduced pressure). These polymer samples are referred to as "crude product", and extracted polymer samples as "purified".

For identification, the PLA samples were analyzed by IR spectroscopy. The IR spectra of the polymers analyzed show bands characteristic of polyesters: 3500 $cm^{-1}$-terminated —OH group (indication of low molecular mass PLA), 1756 $cm^{-1}$—C=O of the ester group, 1300-1500 $cm^{-1}$—typical ester sequences of the —CO—O— group, 3000, 2945 $cm^{-1}$—C—H of the $CH_3$ and $CH_2$ groups.

Tin-Based Catalysts

Tested initially were tin-based catalysts such as tin(II) chloride ($SnCl_2*H_2O$), tin(II) 2-ethylhexanoate and tin(II) octanoate ($SnOct_2$) and also the catalyst/activator systems $SnCl_2$/p-TSA and $SnOct_2$/TPP. Tin-based catalysts are among the most commonly used catalysts in the context of PLA synthesis. The advantage of the tin-based catalysts lies in their high catalytic efficiency.

The synthesis of PLA was carried out in two steps. The 80% strength L-lactic acid was dewatered under nitrogen at a temperature of 130° C. for 2 h. The dewatered lactic acid was polymerized at 185° C. for 6 h under reduced pressure.

After the end of the polycondensation, crude products were obtained that were pale yellowish and had a woody odour. The extracted polymers took the form of white, powder-like or fibre-like materials. The yields of the polymers were found to be in the range from 70% to 85%, based on the amount of the dewatered lactic acid. The molar masses of the resulting polymers and their molar mass distributions were measured by means of GPC.

The higher molar masses of the crude products and of the purified samples were obtained in the presence of tin octoate and tin chloride/p-TSA as catalysts. The catalyst/activator system $SnOct_2$/TPP had no effect on the molar masses of the polymers prepared.

The PLA samples prepared were analyzed by means of DSC. The crude products mostly take the form of amorphous polymers. The glass transition temperatures ($T_g$) of the crude products were measured in a range from 26.6° C.

to 40.9° C. ($2^{nd}$ heating curve). The OLA samples have glass transition temperatures within the same temperature range. The low glass transition is a result of the low- and oligomeric compounds present in the polymer. The purified polyester samples from L-lactic acid are semicrystalline polymers with $T_g$=35.4 to 49.4° C., $T_c$=90 to 111° C. and $T_m$=125 to 145° C.

Further Catalysts

A number of experiments in the presence of different organometallic compounds for the preparation of polylactic acid were tested. Compounds selected were titanium(IV) isopropoxide (Ti(iOPr)$_4$), titanium(IV) butoxide (Ti(OBu)$_4$), zinc chloride (ZnCl$_2$), zinc acetylacetonate (Zn(acac)$_2$), copper acetylacetonate (Cu(acac)$_2$), iron acetylacetonate (Fe(acac)$_3$), zirconium acetylacetonate (Zr(acac)$_4$) and also organic compounds such as phosphoric acid (H$_3$PO$_4$), sulphuric acid (H$_2$SO$_4$), succinic anhydride (SAA) and guanidine carbonate (Gu$_2$CO$_3$). The catalyst concentration was employed in a range from 0.2 up to 1.0 wt %, based on the amount of the dewatered lactic acid or OLA.

Polylactic acid was synthesized by two different methods. The difference between the two methods is that in method 1 the dewatering and oligomerizing of the lactic acid was concluded after 2 h at 130° C. Thereafter the oil bath temperature was raised to 185° C. and a catalyst solution was added when the specified oil bath temperature was reached. The reaction time after the addition of catalyst was 6 h.

For method 2, a large amount of oligomeric lactic acid with a molar mass $M_n$ of about 730 g/mol was first prepared without catalyst in 8 h at 150° C. The product obtained after the oligomerization is also referred to below as "OLA". After the melting procedure, at 185° C., the polymerization was initiated by the addition of a catalyst solution. The reaction time was 8 h.

The PLA samples were transparent and had different discolorations depending on the catalysts used. In the presence of titanium-based catalysts, reddish brown polymers were obtained. Iron-based or copper-based compounds gave the PLA samples a green or turquoise discoloration, respectively. The zinc catalysts and the phosphoric acid, on the other hand, produced clear, colourless polymers. The discoloration of the product during the polycondensation of lactic acid may be induced by a variety of factors, such as high reaction temperatures, long reaction times, catalysts, solvents and by-products.

The yield of the prepolymers lay in a range from 72% to 97%. It was found that higher yields of the polymers prepared were obtained by method 2. GPC was used to determine the molar masses of the polymers and their molar mass distributions. It is found that Ti(OBu)$_4$ and Zn(acac)$_2$ are efficient catalysts in relation to the molar mass of the crude products. In the presence of these catalysts, a molar mass $M_n$ of about 4200 g/mol and 7800 g/mol was obtained, respectively.

The PLA samples prepared with inorganic acids and organic compounds as catalysts were likewise analyzed by GPC. It is found that apart from sulphuric acid, the catalytic activity of the organic catalysts is very low. In this case, molar masses $M_n$ of around 13 000 g/mol and $M_w$ of around 26 000 g/mol were measured.

Purification of the prepolymers from the experiments specified above did not take place. Instead, these samples were subjected to further condensation (cf. 2.4.1).

The polylactic acid samples prepared were analyzed by DSC. A glass transition temperature ($T_g$) of 48.7° C. was measured ($2^{nd}$ heating curve). The low glass transition is caused by the low molecular mass and oligomeric compounds present in the polymer.

The behaviour of the prepolymer samples from this series of experiments is no different from that of the samples prepared in the presence of tin-based catalysts.

2.2 Base or Backbone Polymers Based on L- and/or D-Lactic Acid without Use of a Catalyst Use was made alternatively of L-lactic acid (L-LA) or mixtures of D- and L-lactic acid (DL-LA) with an L/D ratio of 50/50, 75/25 and 80/20, without catalyst. The product obtained after the oligomerization of the L-LA is also referred to below as "OLA". The product obtained after oligomerization of the DL-LA is also referred to below as "ODLA". The number-average molar mass ($M_n$) of OLA and ODLA was measured in a range from 1200 to 2000 g/mol. The OLA or ODLA prepared is used for post-condensation, for the synthesis of polyester urethanes, and also with JONCRYL® 4368 for chain extension.

2.3. Preparation of Polylactic Acids Having Terminal Hydroxyl or Carboxylic Acid Functions 2.3.1. Preparation of Hydroxy-Terminated Polylactic Acids Use was made alternatively of L-lactic acid or DL-lactic acid with an L/D ratio of 50/50, 75/25 and 80/20 together with a diol, in order to obtain an OH group as a cap at both ends of the molecule chain. As the diol component, 1,4-butanediol, 1,2-butanediol, hexanediol, 1,2-hexanediol or trimethylolpropane (TMP) were selected. These diols were used in concentration of 2 or 4 mol %, based on the anhydrous lactic acid. The products obtained are identified in analogy to the designation in section 1, as "OLA-OH" or as "ODLA-OH", respectively.

The molar mass ($M_n$) of OLA-OH or ODLA-OH without catalyst was measured in a range from 1200 to 1900 g/mol. During the conduct of the experiments, no influence of the L/D ratio was found on the molar mass of the oligomeric lactic acid prepared.

A number of series of experiments were carried out in the presence of different organometallic compounds to accelerate the preparation of oligomeric lactic acid. Use was made of tin(II) 2-ethylhexanoate (SnOct$_2$), titanium(IV) isopropoxide (Ti($^i$OPr)$_4$), titanium(IV) butoxide (Ti(OBu)$_4$), zinc acetylacetonate (Zn(acac)$_2$) and zirconium acetylacetonate (Zr(acac)$_4$) in a concentration of 0.5 and 1.0 wt %, based on the amount of OLA. Tin(II) 2-ethylhexanoate (SnOct$_2$) was used as reference, since tin(II) catalysts have a very high catalytic activity.

The molar mass ($M_n$) of the OLA-OH or ODLA-OH prepared was measured in a range from 1600 to 3700 g/mol. The best results, based on $M_n$, were achieved with SnOct$_2$ and with titanium-based catalysts.

The OH-terminated oligomeric lactic acids prepared are hard, brittle and amorphous polymers. The OLA-OH or ODLA-OH prepared in this way was used for chain extension with diisocyanates.

2.3.2. Preparation of Carboxylic Acid-Terminated Polylactic Acids

In order to obtain COOH-terminated oligomeric lactic acid, L-lactic acid was reacted with succinyl chloride or succinic anhydride with and without catalyst. The product obtained after the polymerization is designated "OLA-COOH". The molar mass of the oligomers was 900 g/mol. This oligomeric lactic acid was used for reaction with polyols and polyesters for the preparation of copolymers.

2.4. Chain Extension and Modification of Polylactic Acids 2.4.1. Subsequent Condensation in the Melt Low molecular mass PLA can be modified by various post-polycondensation methods to give a high molecular mass polymer, by means, for example, of post-condensation in the melt or by polycondensation in the solid phase. To carry out the post-condensation in the solid phase, precursors of low or medium molar mass, in the form of granules or powders, are heated below their melting point in an inert gas atmosphere or under reduced pressure. In this case the higher molar masses can be built up in a gentle way.

The polycondensation of lactic acid and the post-condensation of the prepolymers can be combined with one another. In this case, in addition to the first three stages of the direct polycondensation, an additional fourth stage is used. In the fourth stage, the polymer is cooled below its melting temperature. This is accompanied by formation of solid PLA particles. On crystallization of the solid particles, a crystalline phase and an amorphous phase are formed. The reactive end groups and also the catalyst are located in the amorphous phase between the crystals. Although the polycondensation is carried out in the solid state at low temperature, high molecular mass polymers can be obtained.

The rate-determining step in the solid-phase polycondensation is the mass transport of the water of reaction by molecular diffusion. The removal of the water of reaction can be assisted by the reaction procedure under reduced pressure or in an inert atmosphere (cf. A. Södergård and M. Stolt, "Industrial production of high molecular weight poly (lactic) acid", in "Poly(lactic acid)", eds.: R. Auras, L.-T. Lim, S. E. M. Selke and H. Tsuji, Wiley, 2010).

2.4.1.1. Post-Condensation of the Polylactic Acids Obtained According to Section 2.1.2.

General Reaction Conditions

The low molecular mass crude products from the above-described polycondensation according to section 2.1.2. of the lactic acid were post-condensed in the melt.

The crude PLA product was weighed out into a flask equipped with a magnetic stirrer, a distillation bridge, a receiver and a cold trap. The contents of the flask were heated to 185° C. When the polymer was melted, reduced pressure (about 14 mbar) was applied and the batch was held at this temperature for 15 h. After the end of the reaction, the polymer was dissolved in chloroform and precipitated from ice-cold methanol. Following filtration, the filter cake was first air-dried and then dried to constant weight in a vacuum drying cabinet at 60° C. overnight.

The polymer samples obtained were analyzed by GPC. In comparison to the molar masses of the starting products, the post-condensation has produced molar masses $M_n$ that were almost twice as high. The best results were achieved with zirconium acetylacetonate, iron acetylacetonate, zinc chloride and also with phosphoric acid. The highest molar masses $M_n$ of 14 500 g/mol and $M_w$ of 22 500 g/mol were afforded by the post-condensation in the presence of zirconium acetylacetonate as catalyst.

DSC measurements were carried out on the samples. A comparison between the DSC plots for a PLA sample before and after the post-condensation and also after purification shows that all of the DSC measurement plots exhibit a significantly pronounced glass transition. The glass transition temperature of the post-condensed crude sample is 6° C. higher than the glass transition temperature of the starting polymer. Following the extraction of the post-condensed PLA sample, the glass transition temperature is more than 20° C. higher, as compared with the original polymer sample, and is situated at 54.7° C. The position of the glass transition correlates with the molar masses of the polymer samples.

Likewise clearly apparent is a shift in the post-crystallization temperature of the starting polymer with respect to the purified and post-condensed PLA sample. The melting point of the purified and post-condensed PLA sample is shifted towards higher temperatures. A twin peak in the melting range is typical of PLA.

Various catalysts for the preparation of PLA were selected and tested. Very good results in relation to the molar masses and the yields of the polymers of lactic acid prepared were achieved using tin-based catalysts.

Titanium(VI) isopropoxide gave a polymer (crude product) with a lower molar mass $M_n$ and broader molar mass distribution than titanium(VI) butoxide. Following purification, the corresponding polymers had virtually the same molar mass $M_n$. The polymers prepared with titanium catalysts exhibit a reddish brown discoloration. The protic acids produced polymers having a molar mass $M_n$ of around 4500 g/mol, and can continue to be used as catalysts. Iron and zirconium acetylactonates likewise gave polymers having acceptable molar masses. The discoloration may come about as a result of various factors, such as high reaction temperatures, long reaction times, catalysts, solvents and by-products. The post-condensation of the PLA samples prepared generally brought about a distinct increase in the molar masses. The highest molar masses $M_n$ of 14 400 g/mol and $M_w$ of 22 500 g/mol were afforded by post-condensation in the presence of zirconium acetylacetonate as catalyst.

2.4.1.1. Post-Condensation of the Polylactic Acids Obtained According to Section 2.2

The low molecular mass crude products from the polycondensation of lactic acid described in section 2.2. were post-condensed in the melt to give polymers of higher molecular mass. For this purpose the OLA was heated to 180° C. When the polymer was melted, catalyst was added, reduced pressure (about 50 mbar) was applied and the batch was held at this temperature for 15 h or 24 h.

In comparison to the molar masses of the starting products ($M_n$ of OLA or ODLA: 2300 g/mol), the post-condensation gave molar masses $M_n$ that were more than three times as high (7300 g/mol) with zirconium acetylacetonate as catalyst.

All of the DSC plots show a significantly pronounced glass transition. The specimen of L-lactic acid is a semicrystalline polymer having a glass transition temperature $T_g$=41.1° C., recrystallization temperature $T_c$=103° C. and melting temperature $T_m$=135° C. A twin peak in the melting range is typical for PLA. The specimens of L-lactic acid with 50% and 25% D-lactic acid fraction are amorphous polymers. The $T_g$ of the specimen with 50% D fraction is 6° C. higher than the $T_g$ of the specimen with 25% D fraction. The differences in the $T_g$ may result from the molar mass of the respective sample. The position of the glass transition correlates with the molar masses of the polymer samples.

2.4.2. Preparation of Copolymers of Lactic Acid

The increase in the molar masses of the low molecular mass prepolymers prepared may be achieved by means of various processes. On the one hand, this can be done by a transesterification. On the other hand, the chain extension with diisocyanates may lead to higher molar masses.

2.4.2.1. Transesterification with Different Polyesters

The block copolymers can be prepared by intensively mixing two or more homopolyesters or copolyesters in the melt. The different polyesters react via the chain-linking ester groups, with intermolecular inter-chain exchange (cf. W. M. Stevels, A. Bernard, P. van der Witt, P. J. Dijkstra and J. Feijen, "Block copolymers of poly(L-lactide) and poly(e-caprolactone) or polyethylene glycol) prepared by reactive extrusion" Journal of Applied Polymer Science, Vol. 62 (1996) 1295-1301). In this way it is possible to convert structurally different homopolyesters or else homopolyesters with copolyesters into block copolymers. The block copolymers may also be prepared from a homopolymer and a monomer. For the transesterification of low or medium molecular mass PLA samples from the experimental series above, different polyesters were selected and tested. The selection includes two different PHBHx grades and PBS.

Poly(3-hydrdoxybutyrate-co-3-hydroxyhexanoate) (PHBHx) is a new member of the PHA family that has recently been prepared on the industrial scale (cf. G. Q. Chen, G. Zhang, S. J. Park and S. Y. Lee "Industrial scale production of poly(3-hydroxybutyrate-co-3-hydroxyhexanoate)" Appl. Microbiol. Biotechnol. 2001, 57, 50-5. Owing to long-chain branching, reducing the crystallinity and melting temperature, PHBHx exhibits a significantly different behaviour in comparison to PHB.

Polybutylene succinate (PBS) is a commercially available, biodegradable polymer. High molecular mass PBS melts at 114 to 118° C. and has a glass transition at −40° C. The biodegradable block copolyesters can be obtained by a melt polycondensation of OH-terminated PBS prepolymers as soft segment and PLA as hard segment. The glass transition temperature of these copolyesters is between the glass transition temperatures of PLA and PBS as a function of the length of the PLA blocks (cf. C. Ba, J. Yang, Q. Hao, X. Liu and A. Cao "Syntheses and physical characterization of new aliphatic triblock poly(l-lactide-b-butylene succinate-b-l-lactide)s bearing soft and hard biodegradable building blocks" Biomacromolecules 2003, 4, (6), 1827-1834; L. Jia, L. Yin, Y. Li, Q. Li, J. Yang. J. Yu, Z. Shi, Q. Fang and A. Cao "New Enantiomeric Polylactide-block-Poly(butylene succinate)-block-Polylactides: Syntheses, Characterization and in situ Self-Assembly" Macromolecular Bioscience 2005, 5 (6), 526-538). The flexibility of the PLA blocks is significantly improved by PBS blocks.

General Reaction Conditions

In a three-necked flask equipped with a distillation bridge, a gas introduction line (or vacuum line), a receiver, a bubble counter (or cold trap) and a magnetic stirrer with oil bath, PLA or OLA, PHBH or PBS was melted in a 50:50 ratio and with 0.5 wt % of $Zr(acac)_4$ as catalyst. The reaction was carried out for 8 h under a nitrogen atmosphere (or reduced pressure). "PHBH-7 mol" denotes the fraction of the hexanoate in the PHBH. "OLA-COOH" denotes carboxyterminated oligomeric PLA prepared from lactic acid and adipic acid. "PBS—OH" is an OH-terminated PBS prepolymer. The parameters are summarized in Table 1.

TABLE 1

Conditions of the transesterification of PLA or OLA with different polyesters; the weight ratio of component 1 to component 2 was always 1:1

| Experiment | Component 1 | | | Component 2 | | | T [° C.] |
|---|---|---|---|---|---|---|---|
| | | $M_n$ [g/mol] | $M_w$ [g/mol] | | $M_n$ [g/mol] | $M_w$ [g/mol] | |
| CoPLA 1 | PLA | 1500 | | PHBH-7 mol | 193 200 | 473 700 | 165 |
| CoPLA 2 | PLA | 1500 | | PHBH-7 mol | 193 200 | 473 700 | 165 |
| CoPLA 3 | OLA-COOH | 700 | 1200 | PBS-OH | 9900 | 22 300 | 180 |
| CoPLA 4 | OLA-COOH | 700 | 1200 | PBS-OH | 1900 | 2800 | 180 |

The PLA components were used without purification beforehand.

Polymerization of PLA and PHBH-7 Mol

The copolyesters of PLA and PHBH are yellowish, hard, elastic and cloudy materials. Following extraction, white polymers in powder form were obtained. Depending on the reaction regime, the observed course of the reaction between PLA and PHBH-7 mol was different. Under a nitrogen atmosphere, a large amount of dilactide was formed. In the case of the reaction regime under reduced pressure, no formation of dilactide was found. The reaction between PLA and PHBH-11 mol likewise ran without dilactide being formed.

GPC was used to determine the molar masses of the resulting polymers and their molar mass distributions. The copolyester of PLA and PHBH-7 mol, prepared under a nitrogen atmosphere, had a polydispersity of 3.17 and a bimodal distribution, meaning that there is a mixture of relatively high and low molecular mass constituents present. The elugram of the polymer sample prepared under reduced pressure from PLA and PHBH-7 mol likewise shows a bimodal distribution.

Analysis of the GPC elugram of the copolymer of PLA and PHBH-7 mol prepared under a nitrogen atmosphere gave a molar mass $M_n$ of 4200 g/mol and a molar mass $M_w$ of 13 400 g/mol. The copolyester prepared under reduced pressure has a number-average molar mass $M_n$ of 3800 g/mol, $M_w$ of 10 700 g/mol and a polydispersity of 2.82.

Because of the long reaction times and the use of catalyst in the case of high molecular mass PHBH, there has presumably been a degradation. As a result, short-chain molecules with flexible and accessible end groups or active centres have formed, which have in turn undergone partial reaction with PLA ends to form a block polymer.

After the purification of both samples, a molar mass $M_n$ of 6500 g/mol, $M_w$ of 13 000 g/mol and the polydispersity $M_w/M_n$ of 2.1 were measured. In spite of the purification, the polymer samples had a bimodal distribution.

The melting behaviour of the polyester samples obtained was thermoanalytically investigated by means of DSC. The glass transition temperature of the polymer of PLA and PHBH-7 mol lies between the glass transition temperatures of the starting polymers and is 5.3° C. An endothermic peak at 23.7° C. might correspond to the post-crystallization of PHBH. The post-crystallization of PLA follows at 74° C. The melting peak has a double maximum. The melting point is 124° C.

Polymerization of OLA and PBS

The polymers of OLA and PBS are yellowish, hard-elastic materials. The GPC measurements of the samples of OLA-COOH and PBS—OH gave an $M_n$ value of 2800 and an $M_w$ value of 4600 g/mol. An increase in the molar masses suggests that a copolymer has been prepared.

The copolyesters of OLA-COOH and PBS—OH were analyzed thermally by means of DSC. The copolyester is a semicrystalline polymer having a glass transition at −13.4° C. The glass transition temperature of the copolyester is between −40° C. for PBS and 2.4° C. for OLA-COOH (2 mol % adipic acid). A single glass transition suggests that the amorphous PBS and PLA segments are highly compatible, which might have led to the formation of a mixed amorphous phase. The melting point of PBS—OH is 114° C. The melting point of the copolymer is shifted in the direction of lower temperatures, and was found to be 82° C. Postcrystallization takes place at about 49° C.

2.4.2.2. Transesterification with Polyols

The properties of PLA can be adjusted through copolymerization with various diols and/or polyols. Comonomers used may be PEG, PPG or 1,4-butanediol (1,4-BDO).

General Reaction Conditions

In a three-necked flask equipped with a distillation bridge, a gas introduction line, a receiver, a bubble counter (or cold trap) and a magnetic stirrer with oil bath, PLA or OLA-COOH and polyol and also Zr(acac)$_4$ or Zn(acac)$_2$ as catalyst were melted and stirred under a nitrogen atmosphere for 8 h. Table 2 summarizes the reaction parameters. The number following the polyglycols gives the molecular mass $M_w$ of the compounds.

TABLE 2

Compilation of the experiments conducted; the weight ratio of component 1 to component 2 was always 80:20

| Experiment | Component 1 | $M_n$ [g/mol] | $M_w$ [g/mol] | Component 2 | T [° C.] |
|---|---|---|---|---|---|
| CoPLA 5 | OLA-COOH | 850 | | PEG1000 | 180 |
| CoPLA 6 | OLA-COOH | 850 | | PEG4000 | 180 |
| CoPLA 7 | PLA | 3600 | 9300 | PPG2025 | 180 |
| CoPLA 8 | PLA-COOH | 3100 | 4600 | PPG2025 | 180 |

OLA-COOH was prepared by the condensation of lactic acid with 2 mol % of adipic acid. PLA-COOH was obtained by the reaction of low molecular mass PLA and 2 wt % of succinyl dichloride. The COOH-terminated PLA and OLA were used as macromonomers, since the functionality of the end groups of the polymer has consequences for the molecular weight of the multi-block copolymer.
Polymerization of PLA with PEG The polymers of OLA-COOH and PEG1000 and PEG4000 are solid, pale yellowish, elastic products. The yield found for the block copolymers prepared was 97%, based on the overall mass of the polymer components employed.

The overall molar mass of the PLA segments and PEG1000 segments was calculated to be 1850 g/mol. The results of GPC measurement showed that the polymer of OLA-COOH and PEG1000 has molar masses of 4100 g/mol for $M_n$ and 7500 g/mol for $M_w$. The polymer of OLA-COOH and PEG4000 has molar masses of 3500 g/mol for $M_n$ and 9900 g/mol for $M_w$. The sample has a bimodal distribution. The sample prepared consists of a high molecular mass fraction ($M_n$ of 18 700 g/mol, $M_w$ of 19 900 g/mol) and of a low molecular mass fraction ($M_n$ of 2300 g/mol, $M_w$ of 3500 g/mol). From the increase in molar mass in the resultant polymer it can be assumed that a copolyester has been formed. Pure polyethylene glycol with a molecular weight of 1000 g/mol (PEG1000) is a white solid and melts at about 37° C.; PEG4000 melts at about 55° C.
Polymerization of PLA with PPG2025

As well as the polyethylene glycols, polypropylene glycol 2025 (PPG2025) was used for the synthesis of copolymers. The copolymers were first prepared from the post-condensed PLA sample with a number-average molecular weight of 3600 g/mol. The PLA material was not purified beforehand. The overall molar mass of the PLA and PPG2025 segments of this copolymer was calculated to be 5600 g/mol.

The GPC measurement results show that the crude product of PLA-SSP ($M_n$=3600 g/mol) and PPG2025 has the molar masses $M_n$ of 7100 and $M_w$ of 12 200 g/mol. The copolymer of COOH-terminated PLA ($M_n$=3100 g/mol) and PPG2025 has almost identical values for $M_n$ of 7200 g/mol, and for $M_w$ of 11 800 g/mol. Considering the overall molar mass of the PLA and PPG2025 segments and the molar masses of the resulting copolymers, it is not unambiguously discernible from the GPC measurements whether a block copolymer or a blend is present.

The polymers prepared were analyzed by DSC. The glass transition temperature of the polymers based on PLA and PPG is lower than that of PLA before the introduction of the flexible PPG segments.

The glass transition temperature of the copolymer of PLA and PPG2025 lies between the glass transition temperatures of the starting polymers and is 7.0° C. and 9.5° C., using PLA-SSP and PLA-COOH accordingly. An endothermic peak at 85° C. might correspond to the post-crystallization of PLA. The melting peak has a double maximum.
2.4.2.2.1. Preparation of Backbone Polymers by Transesterification of OLA-COOH or ODLA-COOH in Accordance with Section 2.3.2 with Polyols A characteristic feature of customary base polymers for PSAs are glass transition temperatures in the range from −70 to −20° C. The thermal properties of PLA can be adjusted by transesterification with polyols.

For this purpose, COOH-terminated oligomeric lactic acid according to section 2.3.1 is reacted with polyethylene glycol of average molar mass 1000 g/mol (PEG1000) and with polypropylene glycol of average molar mass 2000 g/mol (PPG2000). The OLA-COOH/PEG1000 and OLA-COOH/PPG2000 ratios were set at 50/50 and 80/20. Determination of the molar mass of the copolymers prepared with polyols, by means of GPC, showed—as expected—higher molar masses than the sum of the average molar masses of the starting polymers. By means of IR-spectroscopic analyses it was possible to confirm the formation of a copolymer.

It is known that the glass transition temperature $T_g$ and the melting temperature $T_m$ go down as the PPG content of the copolymer goes up. PPG with an atactic microstructure is amorphous and has a glass transition temperature of −75° C. to −60° C. Because of the $T_g$ of the PPG-rich phase, the rubber-elastic character of the material is increased at RT.

DSC measurement plots were recorded for the copolymers with different levels of PPG2000. The copolymer of OLA-COOH and PPG2000 with a ratio of 50/50 shows a significantly lower $T_g$ (−32° C.) than a copolymer with a ratio of 80/20 ($T_g$ of 4° C.)

The copolymer OLA-COOH/PPG2000 (80/20) also exhibits pronounced melting and crystallization events. The melting peak in the $2^{nd}$ heating curve has a double maximum. Here there are two successive crystallization processes: samples were first crystallized during the cooling process, with insufficient time for complete crystallization, and were then crystallized completely in the course of subsequent heating. In the case of the specimen with a ratio of 50/50, the melting process is weakly pronounced.

In comparison to the copolymers of PPG2000, a copolymer of OLA-COOH and PEG1000 (50/50) is amorphous. Neither melting nor crystallization processes were detected. Analyses of the thermal properties of the copolymers show that the copolymer might be a multi-phase system having two separate glass transition temperatures. A complete phase separation with two separate $T_g$s might have taken place.
2.4.3. Preparation of Backbone Polymers Based on Polyesterurethanes
General Points Aliphatic polyesters, such as polylactic acid, must have a high molecular weight in order to have acceptable mechanical properties. The synthesis pathway of direct lactic acid polycondensation, however, is time-consuming and costly. As an alternative, the high molecular mass PLA may be synthesized in a two-stage process. First the lactic acid is polycondensed and then an increase in the molecular weight is achieved through reaction with diisocyanates. The end product is a thermoplastic polyesterurethane. Polyesterurethanes can be synthesized using various diisocyanates as crosslinker molecule and/or as chain extender, such as, for example, toluene 2,4-diisocyanate (2,4-TDI), toluene 2,6-diisocyanate (2,6-TDI), isophorone diisocyanate (IPDI), 4,4'-diisocyanatodiphenylmethane (4,4'-MDI), 2,4'-diisocyanatodiphenylmethane (2,4'-MDI), polymeric diphenylmethane diisocyanate (pMDI) or hexamethylene diisocyanate (HDI). Chain extension takes place through reaction of the hydroxyl groups in the polyester with the isocyanate groups in the diisocyanate.

Zhong et al. (cf. W. Zhong, J. Ge, Z. Gu, W. Li, X. Chen, Y. Zang and Y. Yang "Study on Biodegradable Polymer Materials Based on Poly-(lactic acid). I. Chain Extending of Low Molecular Weight Poly(lactic acid) with Methylenediphenyl Diisocyanate" Journal of Applied Polymer Science 1999, 74, (10), 2546-2551) investigated the chain extension of low molecular mass PLA with MDI to give a high molecular mass PLA, and found that the polymers obtained have a relatively high thermal stability. The thermal stability of the resulting polymers was concluded from the increase in the glass transition temperature. The synthesis of thermoplastic polyesterurethanes was investigated by Härkönen et al. (M. Härkönen, K. Hiltunen, M. Malin and J. V. Seppala "Properties and polymerization of biodegradable thermoplastic poly (ester-urethane)" Journal of Macromolecular Science, Part A 1995, 32, (4), 857-862). The OH-terminated prepolymers were prepared from L-lactic acid and a small amount of 1,4-butanediol. Polyesterurethanes were prepared in the melt using aliphatic diisocyanates as chain extenders. The mechanical properties of these polyesterurethanes are comparable with those of polylactides obtained by a ring-opening polymerization. The rheological measurements show that the polymer can be processed by conventional techniques such as injection moulding and extrusion.

An innovative biodegradable polyesterurethane consisting of PLLA segments and PBS segments is synthesized by a chain extension reaction of PLLA-OH and PBS—OH with toluene 1,4-diisocyanate (TDI) as chain extender. The properties can be controlled by varying the molar masses of prepolymers and the mass ratio of PLLA-OH to PBS—OH. The polyesterurethanes prepared are more stable to thermal decomposition than PLLA-OH. Tensile tests show that the toughness of the PLLA is largely improved by introduction of PBS segments (cf. J.-B. Zeng, Y.-D. Li, Q.-Y. Zhu, K.-K. Yang, X.-L. Wang and Y.-Z. Wang "A novel biodegradable multiblock poly(ester urethane) containing poly(l-lactic acid) and polybutylene succinate) blocks" Polymer 2009, 50, (5), 1178-1186).

The course of the chain extension is determined by the amount of diisocyanates used. Likewise of great importance for the chain extension process are the end groups of the polyester (cf. A. Södergård and M. Stolt "Industrial production of high molecular weight poly(lactic acid)", in "Poly (lactic acid)", eds.: Auras, R.; Lim, L.-T., Selke, S. E. M.; Tsuji, H., Wiley, 2010).

The chain extension reaction between equimolar amounts of diisocyanates and hydroxy-terminated prepolymers proceeds very rapidly. The molar mass reaches its maximum in just a few minutes. After the maximum has been reached, there is a decrease in molar mass as a result of the thermal decomposition. An increase in the weight-average molar mass $M_w$ with no change in the number-average molar mass $M_n$ may be taken as an indicator of the secondary reactions taking place, if the amounts of diisocyanate used are increased.

The carboxyl groups may likewise react with isocyanates to form amides, carboxylic anhydrides or ureas. The presence of carboxyl groups would retard the reaction between the hydroxyl and isocyanate groups. The acid number (AN) of the prepolymers is an important parameter and is therefore useful as a tool for controlling the chain extension reaction (cf. A. Södergård and M. Stolt "Industrial production of high molecular weight poly(lactic acid)", in "Poly (lactic acid)", eds.: Auras, R.; Lim, L.-T., Selke, S. E. M.; Tsuji, H., Wiley, 2010).

The stoichiometric ratio for a reaction of isocyanates with polyols is indicated by way of the NCO/OH ratio (index). In the case of the reaction of polyisocyanates with polyols, the stoichiometric ratio present is very critical to the polymer synthesis and the resulting polymer properties. The reaction of difunctional polyols with difunctional isocyanates leads to high molecular mass polymers only if the two reaction partners are present in equivalent amounts. In the case of an excess of polyol, the molar mass attained falls in proportion with the excess, and OH-terminated oligomers are obtained. In the case of an excess of isocyanate, accordingly, NCO-terminated, reactive prepolymers are obtained whose molar mass can be adjusted via the stoichiometric ratio of NCO to OH (cf. B. Müller and W. Rath "Formulierungen von Kleb- and Dichtstoffen" [Formulations of Adhesives and Sealants] 2004).

General Reaction Conditions

For the chain extension of low molecular mass prepolymers of lactic acid, pMDI with an NCO content of around 31.5 wt % (DESMODUR 1520 A20, Bayer MaterialScience AG) was used. pMDI is referred to as polymeric MDI, technical MDI or polymeric diphenylmethane diisocyanate. In addition, 2,4-TDI was used as well for the chain extension.

In a flask equipped with a distillation bridge, a bubble counter, a receiver, a gas introduction line and a magnetic stirrer with oil bath, OH-terminated PLA or OH-terminated OLA was melted at 160° C. under a nitrogen atmosphere. Diisocyanate solution was added dropwise to the reaction mixture, which was stirred at 160° C. for 1 hour more. Table 3 summarizes the experiments conducted on the chain extension of oligomeric and low molecular mass PLA.

TABLE 3

Compilation of the experiments conducted

| Experiment | $m_{(PLA)}$ [g] | M(PLA) [g] | OHN [gKOH/kg] | $c_{(OH)}$ [%] | DI type | m(DI) [g] | $c_{(DI)}$ [wt %] | $c_{(NCO)}$ [%] | NCO/OH |
|---|---|---|---|---|---|---|---|---|---|
| CoPLA 9  | 15.12 | 806  | 139 | 4.23 | pMDI | 0.63 | 4   | 31.5 | 0.1  |
| CoPLA 10 | 52.92 | 4900 | 23  | 0.70 | pMDI | 5.66 | 10  | 31.5 | 1.7  |
| CoPLA 11 | 36.16 | 4900 | 23  | 0.70 | pMDI | 0.38 | 1   | 31.5 | 0.17 |
| CoPLA 12 | 36.28 | 4900 | 23  | 0.70 | pMDI | 0.91 | 2.5 | 31.5 | 0.4  |

TABLE 3-continued

Compilation of the experiments conducted

| Experiment | $m_{(PLA)}$ [g] | M(PLA) [g] | OHN [gKOH/kg] | $c_{(OH)}$ [%] | DI type | m(DI) [g] | $c_{(DI)}$ [wt %] | $c_{(NCO)}$ [%] | NCO/OH |
|---|---|---|---|---|---|---|---|---|---|
| CoPLA 13 | 36.77 | 4900 | 23 | 0.70 | TDI | 0.40 | 1 | 48.3 | 0.3 |
| CoPLA 14 | 38.12 | 4900 | 23 | 0.70 | TDI | 2.05 | 5 | 48.3 | 1.52 |
| CoPLA 15 | 36.77 | 4900 | 23 | 0.70 | TDI | 0.7019 | 2.5 | 48.3 | 0.54 |

The methods employed for identifying the polyesterurethanes based on PLA and diisocyanates included IR spectroscopy. The IR spectra of the polyesterurethanes show two characteristic bands at 1530 cm$^{-1}$ and 1220 cm$^{-1}$, of which the latter may also be superimposed by a polyester band in the same region. The polyesterurethanes have two intensive bands at 1150 cm$^{-1}$ to 1250 cm$^{-1}$. In the IR spectrum, the aromatic isocyanates can be discerned from a number of characteristic bands. For example: TDI—bands at 450 and 1600 cm$^{-1}$; and MDI—bands at 500, 1410 and 1600 cm$^{-1}$. It is very easy to determine residual NCO by means of IR spectroscopy: the NCO band at 2270 cm$^{-1}$ is one of the most intensive bands and is virtually undisrupted by the absorption of other molecular groups.

Reactions of PLA with pMDI

Comparing the NCO/OH ratios in the experiments conducted (Table 3), it becomes clear that NCO-terminated reactive polymers were obtained only in the CoPLA 10 experiment. Such polymers are able to react further with OH-terminated polyols.

The NCO/OH ratio is reflected accordingly in the molar masses of the resulting polymers. After the chain extension there was an increase in the molar masses of the polymers prepared. This suggests that the reaction between pMDI and the OH groups has taken place. The molar masses $M_n$ and $M_w$ of the copolymers rose from an $M_n$ of 4000 g/mol and an $M_w$ of 7000 g/mol for the starting material, with increasing pMDI concentration, up to an $M_n$ of 7000 g/mol and an $M_w$ of 13 400 g/mol. A substantial increase in the molar masses, especially $M_w$, and, accordingly, a substantial increase in the polydispersity was obtained in an experiment where pMDI was in excess, at about 70%. Here, $M_n$ values of 14 600 g/mol, $M_w$ values of 70 300 g/mol and a PD of 4.8 were found. The excess isocyanate groups can also react with carboxyl groups in the PLA to form amide bonds, or with the urethane group may lead to chain branching or crosslinking. Chain branching results in a broadening of the molar mass distribution. This is probably the reason for the larger molar mass distribution (MWD) of the chain-extended PLA samples in comparison to the prepolymer.

The DSC measurement results of the PLA samples prepared by chain extension show that the glass transition temperature of the copolymers is higher than that of the starting material. The glass transition temperature after chain extension is almost 20° C. higher than the glass transition temperature prior to chain extension. The $T_g$ of the copolymers of OH-terminated PLA and pMDI that were analyzed is in the range from 44.7° C. to 61.5° C. with increasing amounts of pMDI employed. The $T_g$ of the starting material is 39° C. If, instead of PLA-OH, OLA-OH with a molar mass of around 806 g/mol was reacted as the polyol component with pMDI, then the $T_g$ was only 17.6° C.

Reactions of PLA with TDI

The molar masses of the polymers prepared increased in comparison to the prepolymers used. The molar masses $M_n$ and $M_w$ of the polymers rose from an $M_n$ of 4900 g/mol and an $M_w$ of 7300 g/mol for the starting material up to an $M_n$ of 5400 g/mol and an $M_w$ of 8500 g/mol when only 1.0 wt % of TDI was used. If the TDI content was increased to 5 wt %, the $M_n$ value rose up to 7800 g/mol and the $M_w$ value up to 13 800 g/mol. In these experiments, no increase in the polydispersity was found, meaning in this case no crosslinking reaction took place.

After the chain extension with TDI, the polyester samples were analyzed by DSC. With increasing NCO/OH ratio, a significant increase was observed in the glass transition temperature. This suggests that the polyesterurethanes obtained have a higher thermal stability than PLA.

2.4.3.1. Preparation of Backbone Polymers Based on Polyesterurethanes by Reaction of Hydroxy-Terminated Polylactic Acids According to Section 2.3.1

Thermoplastic polyester-urethanes can be synthesized in a two-stage process. First the lactic acid is polycondensed and then there is an increase in the molecular weight through a reaction with diisocyanates. As a result of the staged polyaddition of different components, it is possible in principle to incorporate segments into the chains at defined locations. Hence it is possible to control the properties such as activity, viscosity and hydrophilicity in a desired way (cf. G. Oertel "Polyurethane, Kunststoff Handbuch" 1993).

The synthesis of PEU based on oligomeric lactic acid as part of this project takes place in two steps. First of all an OH-terminated oligomeric lactic acid is prepared, as described in section 2.3.1. In a subsequent step, the reaction between OLA-OH and a diisocyanate takes place.

The following diisocyanates were used as chain extenders:

diphenylmethane diisocyanate (MDI, DESMODUR®44M, Bayer MaterialScience AG, NCO content about 33.6 wt %), monomeric aromatic diisocyanate;

diphenylmethane diisocyanate with a high fraction of the 2,4' isomer (MDI$_{isomeric}$ DESMODUR® 2460M, Bayer MaterialScience AG, NCO content about 33.6 wt %), monomeric aromatic diisocyanate;

1:1 mixture of 2,2,4- and 2,4,4-trimethylhexamethylene diisocyanate (TMDI, VESTANAT® TMDI, Evonik Industries, NCO content about 40 wt %), methyl group-branched, aliphatic diisocyanate.

The stoichiometric ratio for a reaction of isocyanates with polyols is indicated by way of the NCO/OH ratio (index). The OH number and acid number of the prepolymers used were determined in accordance with DIN EN ISO 2554 and DIN EN ISO 2114. The amount of the diisocyanate was calculated from the data obtained.

The success of a chain extension of polymers based on PLA-OH, polyethylene glycol (PEG) and polypropylene glycol (PPG) is dependent on the reactivity of the various hydroxyl groups. PLA-OH and PPG contain a secondary hydroxyl group, whose activity in relation to isocyanate groups is lower by comparison with the primary hydroxyl groups in PEG. With a higher PEG/PLA-OH ratio in the reaction system, therefore, the chain extension proceeds significantly more quickly, since there are a greater number of primary hydroxyl groups in the reaction mixture. In the present report period, various polyesterurethanes were prepared and investigated for their suitability for producing adhesives:

polyesterurethanes based on OLA-OH and different polyols, and polyesterurethanes based on OLA-OH.

2.4.3.1.1. Preparation of Polyesterurethanes Based on OLA-OH and Different Polyols The polyesterurethanes (PEU) were first prepared from OH-terminated oligomeric lactic acid (OLA-OH) and also PEG1000 and PPG2000 as polyols in a 50/50 ratio by reaction with MDI or $MDI_{isomeric}$. The OLA-OH was prepared with 2 mol % of 1,4-BDO without catalyst. For the experiments conducted, OLA-OH from the same batch was used, in order to verify the reproducibility of the experiments and to highlight more effectively the differences in the reaction profile.

The measured $M_n$ was 1200 g/mol, $M_w$ 1600 g/mol and PD 1.259. The overall molar mass of the OLA and PEG1000 segments was calculated at 2200 g/mol. In the case of PEG1000, the molar mass determination gave an almost three times higher molar mass in comparison to the molar masses of the original materials. The molar masses were 6200 g/mol for $M_n$ and 17 100 g/mol for $M_w$. The specimens, with a polydispersity of 2.8, had a broad molar mass distribution. In the case of the reactions of PEG1000, no difference was found in molar mass between the MDI types used.

The overall molar mass of the OLA segments and PPG2000 segments is 3200 g/mol. With an $M_n$ value of 6700 g/mol, the molar masses of the polyester-urethanes comprising PPG2000 were likewise more than twice as high as those of the starting components. The $M_w$ values were 18 400 g/mol. The polydispersity was 2.7. It was found that the polymers comprising $MDI_{isomeric}$ with $M_n$=8400 g/mol and $M_w$=17 400 g/mol, produce higher molar masses than the polymers comprising MDI ($M_n$=6700 g/mol and $M_w$=18 400 g/mol).

IR-spectroscopic analyses of the specimens show that complete conversion has taken place.

The polymer specimens of OLA-OH and polyols were analyzed by DSC after chain extension with DESMODUR® products. All of the copolymers analyzed showed only one glass transition both in the first heating procedure and in the second heating procedure. Since neither melting nor crystallization processes were detected, the polymers are amorphous. A relationship is apparent between the glass transition temperature and the type of diisocyanate used. The polyester-urethanes had a low $T_g$ when the reaction took place with $MDI_{isomeric}$. It is likewise apparent that the $T_g$s of polyester-urethanes with PEG1000 are lower than those of polyester-urethanes with PPG2000.

2.4.3.1.2. Preparation of Polyester-Urethanes Based on OLA-OH Comprising Linear Diol and Aromatic Diisocyanates The PEU synthesis based on OLA-OH (OH-terminated with 1,4-butanediol) took place initially without catalyst. On the basis of the literature search, the reaction time was set at 20 minutes starting from the addition of the diisocyanate. The amount of diisocyanate was calculated by the end-group determination of the OLA, and amounted to around 20 wt %. The results of the molar mass determination showed that the reaction with diisocyanates has led only to the doubling of the molar masses in comparison to the starting materials. No difference was found between OLA-OH and ODLA-OH. The IR spectra did not exhibit any free NCO bands. This suggests that the amount of diisocyanate used has been fully converted.

The results of the molar mass determination show clearly that the addition of diisocyanates to the secondary OH group of the OLA proceeds very slowly without catalyst and that the molar masses of the PEU are built up only slowly.

After the chain extension with DESMODUR® products, the polymer specimens of OLA-OH and ODLA-OH were analyzed by DSC. In this series of experiments as well, all of the copolymers analyzed exhibit only one glass transition both in the first heating procedure and in the second heating procedure. Since neither melting nor crystallization processes were detected, the polymers are amorphous.

First of all the specimens prepared without a catalyst were analyzed by DSC and the results were evaluated. It emerged that the polyester-urethanes comprising OLA-OH and MDI terminated with 2 mol % of 1,4-BDO exhibit a higher $T_g$ than the specimens comprising MDI and ODLA-OH terminated with 2 mol % of 1,4-BDO (50/50). The difference between the specimens of the same ODLA-OH (50/50) and MDI and $MDI_{isomeric}$ was small. For a chain-extended PEU, the $T_g$ increases up to 54° C., in comparison to 20° C. for OLA-OH.

In order to accelerate the chain extension, different catalysts were used. The catalyst was used either during the synthesis of the OLA-OH (OH-terminated with 1,4-butadiol) itself and/or during the reaction with the diisocyanates. The catalyst tested to start with was zinc acetylacetonate ($Zn(acac)_2$) and zirconium acetylacetonate ($Zr(acac)_4$) with a concentration 0.5 wt %. These experiments on the chain extension of OLA-OH or OLDA-OH with DESMODUR® products, however, showed that the molar mass increase proceeds only very slowly in spite of the zinc acetylacetonate ($Zn(acac)_2$) or zirconium acetylacetonate ($Zr(acac)_4$) catalyst employed.

It was found, moreover, that the composition of the oligomeric lactic acid (with D fractions of 50%, 25% or 20% or with no D fraction) has no influence on the rate of the chain extension. On the basis of the good properties, OLA with 20% D fraction was selected for the further series of experiments.

Since zinc acetylacetonate and zirconium acetylacetonate had proved to be only moderately suitable catalysts for the chain extension, in a further experiment the chain extension of ODLA-OH ($M_n$=3700 g/mol; $M_w$=6100 g/mol) was carried out with tin octoate ($SnOct_2$). For this purpose the time profile of the molar masses ($M_n$ and $M_w$) during the reaction of ODLA-OH with $MDI_{isomeric}$ in the melt at 160° C. was investigated. The results of the molar mass determination showed that just 10 minutes after the addition of catalyst an $M_n$ of 11 500 g/mol was attained. The molar mass distribution was relatively narrow, at 1.9. After the total reaction time of 80 minutes, a polymer with an $M_n$ of 9900 g/mol was obtained. The reaction time in the further experiments for the preparation of polyester-urethanes was adapted on the basis of the results obtained.

The catalytically prepared polyester-urethanes comprising ODLA-OH terminated with 2 mol % of 1,4-BDO (80/20) and $MDI_{isomeric}$ have higher glass transition temperatures than polyester-urethanes comprising ODLA-OH terminated with 2 mol % of 1,4-BDO (50/50). The difference between 50 wt % and 20 wt % D fraction for the polyester-urethanes in terms of the $T_g$ amounts to about 7° C.

2.4.3.1.3. Preparation of Polyesterurethanes Based on OLA-OH Comprising Branched Diols and Aromatic Diisocyanates as Backbone Polymers In order to increase the internal strength of the backbone polymers through the incorporation of side groups, further experiments were carried out into the synthesis of polyesterurethanes with the branched diols 2-ethyl-1,3-hexanediol (EHD) and 1,2-hexanediol (1,2-HD). To accelerate the chain extension, titanium(IV) isopropoxide (Ti($^i$OPr)$_4$) and titanium(IV) butoxide (Ti(OBu)$_4$) were used as catalysts, given that zinc-based and zirconium-based catalysts are unsuitable. The diisocyanate used was DESMODUR® 2460M (MDI$_{isomeric}$) since the polyesterurethanes prepared with it have better properties.

The polyesterurethane formed from OLA-OH (EHD) and 0.5 wt % of Ti($^i$OPr)$_4$, after the reaction with 12 wt % of MDI$_{isomeric}$ and after a reaction time of 150 minutes, gave an average molar mass $M_n$ of 9000 g/mol, $M_w$ of 18 700 g/mol and a polydispersity of 2.07. If ODLA-OH (80/20) instead of OLA-OH is reacted under the same conditions with 12 wt % of MDI$_{isomeric}$, then after 2 h a polymer with an $M_n$ of 14 300 g/mol, an $M_w$ of 47 900 g/mol and a PD of 3.35 was obtained.

The polyesterurethane formed from OLA-OH (1,2-HD) and 0.5 wt % of Ti(iOPr)$_4$, after the reaction with 12 wt % of MDI$_{isomeric}$ and after a reaction time of 150 minutes, gave an average molar mass $M_n$ of 8000 g/mol, $M_w$ of 17 100 g/mol and a polydispersity of 2.15. If ODLA-OH (80/20) instead of OLA-OH is reacted under the same conditions with 8 wt % of MDI$_{isomeric}$, then after 1 h a polymer with an $M_n$ of 18 500 g/mol, an $M_w$ of 49 600 g/mol and a PD of 2.69 was obtained.

The polyesterurethane formed from OLA-OH (HD) and 0.5 wt % of TiOBu$_4$, after the reaction with 11 wt % of MDI$_{isomeric}$ and after a reaction time of 30 minutes, gave an average molar mass $M_n$ of 10 700 g/mol, an $M_w$ of 23 300 g/mol and a polydispersity of 2.18. A number of samples were taken during the reaction time in order to determine the relationship between the molar masses and the reaction time.

In comparison to the molar mass of the starting material, the molar mass increases significantly just 7 minutes after the addition of MDI$_{isomeric}$. After 10 minutes, the $M_n$ values attain their maximum, and form a plateau for the next 25 minutes. Within this time, the $M_w$ values rise only slightly. On the basis of these results it was determined that the reaction time for further experimental series with this catalyst is restricted to a maximum of 20 minutes.

The results of the investigations on specimens with EHD in comparison to the specimens with 1,4-BDO show that amorphous polymers have been obtained.

The specimens were analyzed by DSC. The 1$^{st}$ and 2$^{nd}$ heating curves of the specimens analyzed show them to be amorphous. The glass transition of the specimen without D fraction is 2° C. higher than the glass transition of the specimen with D fraction. The specimen with D fraction and 1,4-BDO has a significantly higher glass transition temperature than the specimen with 1,2-hexanediol. This suggests that the instances of chain branching in the PEU lead to the softer and more elastic PEU.

2.4.4. Preparation of Backbone Polymers by Reaction of ODLA with Epoxides

Another possibility for the preparation of PSAs based on saturated polyesters lies in their functionalization with carboxyl groups, which are then, after reaction, reacted with diepoxides. The adhesives which form in this way have high strengths in conjunction with good flexibility.

For this reaction, oligomeric lactic acid (ODLA (80/20)) and JONCRYL® 4368-CS were used. JONCRYL® 4368-CS, available from BASF SE, is a polyfunctional, epoxidized, reactive polymer based on acrylate/styrene copolymers, formulated especially for the applications of PLA and PET in the food industry (EU/FDA approval; FDA: Food and Drug Administration). JONCRYL® 4368-CS is a polymeric chain extender having a weight-average molar mass $M_w$ of 6800 g/mol and an equivalent weight of the epoxide groups of 285 g/mol.

JONCRYL® 4368-CS is able to react with the COOH groups of the oligomeric lactic acid by ring opening, leading to chain extension. The reaction with JONCRYL® 4368-CS also increases the hydrolytic stability.

The concentration of JONCRYL® 4368-CS was 2.5 or 5 wt %, based on the amount of ODLA ($M_n$ 3700 g/mol). It was found that the torque passes through a maximum during the reaction. The increase in the torque can be explained by the increase in the viscosity, and is an indicator that the reaction of the epoxide ring with the COOH groups of the ODLA has taken place.

GPC was used to determine the molar masses of the resulting polymers and their molar mass distributions. The elugrams of both samples with 2.5 and 5 wt % JONCRYL® 4368-CS, recorded by means of GPC, show a bimodal distribution. The molar mass distribution is broad correspondingly, with 2.97 and 4.3. In addition to the relatively high molecular mass fraction, the specimens produced included a fraction of low molecular mass compounds. In the case of the high molecular mass fractions, the molar masses $M_n$ of both specimens are 46 300 and 43 000 g/mol, and their $M_w$ 60 600 and 63 000 g/mol. The low molecular mass fraction has $M_n$ values of 3900 and 3600 g/mol and also $M_w$ values of 6300 g/mol and 5700 g/mol. The values of the low molecular mass fraction correspond to the values of the starting materials. The overall molar masses of the two specimens were $M_n$ 4660 g/mol and 4660 g/mol, and $M_w$ 11 400 and 20 400 g/mol.

The products after the reaction of 2.5 or 5.0 wt % JONCRYL® 4368-CS and ODLA are amorphous materials having a $T_g$ of 35° C.

3. Base Mixtures for Adhesive Compositions

3.1. Specific Analytical Methods

180° Peel Strength Test

The 180° peel strength test was conducted in accordance with AFERA 5001 (cf. DIN EN 1939). Sample preparation from the formulations produced is expanded to include the coating of the backing sheet using an automatic film-drawing instrument (from Zehntner) and a 50 µm coating bar.

The coatweight resulting from a coating speed of 50 mm/s was about 18 g/m$^2$.

3.2. Development of Adhesive Formulations

In the context of the formulations, the objective was initially to find a suitable base formula. For this purpose, suitable adjuvants were preselected, such as tackifiers and plasticizers (TF/PZ) and also an antioxidant (AO). Preliminary experiments play an important part, in particular, in determining the compatibility of the synthesized PLA and CoPLA products, the backbone polymer (BM), with the other components.

Experimental Plan

In order to be able to make initial statements about the melting behaviour of the raw materials, preliminary experiments were conducted. In these experiments the compatibilities of individual components were tested, and also the ratio between binder (BM), i.e. the backbone polymer (PLA, CoPLA), and tackifier/-plasticizer (TF/PZ) was varied.

In the selection of the tackifiers/plasticizers, in addition to the technical suitability, care was taken to ensure that they are based on renewable raw materials (Nawaro). In assessing the technical suitability, account was taken primarily of groups which suggest a particularly good compatibility potential with the binder. This is based on similar properties in comparison to the PLA or CoPLA base polymer.

The preselection of the tackifiers/plasticizers that results from this therefore encompasses the following groups: citrates (Cit), polyethylene glycols (PEG), polar rosin esters (pKE) and aromatic resins (arH).

The antioxidant (AO) selected was 2,2-bis(((3-(3,5-di-tert-butyl-4-hydroxyphenyl)propanoyl)oxy)methyl)-propane-1,3-diyl bis(3-(3,5-di-tert-butyl-4-hydroxy-phenyl)propanoate), which is already established in this field of application and which is added to the formula with a fraction of 1%. The binder fraction in the formula was set to a range between 25% and 35%, by analogy with formulas based on different raw materials. The remaining batch amount, of 65% to 75%, consists of the tackifiers/plasticizers.

The preliminary experiments for investigating the formulatability of the binder specimens took place initially with variation of three parameters:
1. BM-TF combination (from 4 groups in each case 3 TF/PZ)
2. Ratio BM:TF/PZ (3 quantitative ratios)
3. Temperature (3 melting temperatures)

The results from these first experiments provided information on the formulatability of the polylactic acids (PLA) and of their derivatives (CoPLA). The decisive evaluation criterion for this is the homogeneity of the formulation product. In the case of inhomogeneity, there are instances of deposition of one constituent, or a semolina-like mass is formed—both cases lead to difficulties both in formulating and in processing.

Against this background, a plan was first drawn up that included the combinations in each case of one binder with three TF/PZ products from one group. On the basis of this experimental plan, 12 preliminary experiments were used to investigate whether a tackifier/plasticizer is suitable in principle for formulation with PLA or CoPLA as binder.

For each BM specimen, a total of 36 planned experiments are carried out, if suitability is found for the individual tackifiers/plasticizers. In this way, important indications are obtained of the behaviour and the properties of the corresponding raw-material combination, and a foundation is created for further optimization steps.

Formulating/Testing

For the formulation, aluminium beakers with a nominal capacity of 250 ml are used, which fit exactly into the apparatus of the Liebisch thermoblock. The total amount for one batch was set at not less than 50 g and not more than 100 g. The individual components are weighed out into the aluminium beaker and melted using the thermoblock. During this procedure, the composition is stirred, and so the components are thoroughly mixed. During both the melting operation and the mixing of the respective components and also after cooling, the compatibility is assessed visually. The first test for inherent tack is carried out at room temperature by the "finger tack" method. Other property features, such as toughness or viscosity, are likewise estimated after the product has cooled.

Results

With regard to the compatibility, the preliminary experiments showed that the BM products are readily mixable and formulatable with the various tackifiers/plasticizers. There are no apparent differences between crude PLA and pure PLA product during melting and mixing. The results for the different tackifiers/plasticizers after cooling and setting, however, are very different. The products of the polyethylene glycol group and rosin ester group initially gave only a few useful results, since in some cases the formulation products were wax-like, or individual constituents had undergone deposition. Only with the use of the citrates were low-viscosity products obtained. In contrast to this, the products with aromatic resins were hard and brittle.

Based on these preliminary experiments and on positive compatibility tests between citrates and aromatic resins, they were combined to give the 75% TF/PZ fraction and were formulated with the corresponding BM fraction (25%). The citrate component here serves as plasticizer, the resin component as tackifier. The ratio of resin to citrate was changed between 10:90 and 80:20 within the specified fraction (75%). In this way it was possible to produce products which exhibit permanent tack at room temperature. A number of other properties, such as the toughness, for example, appear to change depending on the plasticizer fraction.

As a result of the visual evaluation of selected property features and assessment of the inherent tack by means of "finger tack", a highly promising combination of binder and a mixture of two tackifiers/plasticizers was found. The system in question is in each case a product from the group of the aromatic resins (arH 2) and of the citrates (Cit 3). Mixtures of the resin with the citrate in the ratios of 45:55 to 35:65, in particular, provided a good foundation for the ongoing development of adhesive compositions.

TABLE 4

Criteria of the visual assessment and estimation of property features of selected formulations

| Combination | | | Property features | | | | | |
|---|---|---|---|---|---|---|---|---|
| BM (25%) | TF/PZ (75%) | TF/PZ ratio | Compatibility | Homogeneity | Viscosity | Hardness | Toughness | Finger tack |
| PLA 38 | arH 2  Cit 3 | 45:55 | ++ | ++ | +++ | + | − | ++ |
|  |  | 40:60 | +++ | +++ | ++ | − | +++ | + |
|  |  |  | +++ | ++ | ++ | − | + | + |
| PLA 40 | arH 2  Cit 3 | 45:55 | +++ | +++ | + | −− | + | ++ |
|  |  | 40:60 | +++ | +++ | ++ | − | ++ | ++ |
|  |  |  | +++ | ++ | ++ | − | + | ++ |
| PLA 41 | arH 2  Cit 3 | 45:55 | +++ | +++ | + | − | ++ | ++ |
|  |  | 40:60 | +++ | +++ | +++ | ++ | − | ++ |
|  |  |  | +++ | +++ | +++ | ++ | − | ++ |

TABLE 4-continued

Criteria of the visual assessment and estimation of property features of selected formulations

|  |  |  | 35:65 | +++ | +++ | +++ | ++ | -- | + |
|---|---|---|---|---|---|---|---|---|---|
|  |  |  |  | +++ | +++ | +++ | +++ | --- | + |
| PLA 49 | arH 2 | Cit 3 | 45:55 | ++ | − | + | + | − | + |
|  |  |  | 40:60 | ++ | + | + | − | + | − |
| CoPLA 05 | arH 2 | Cit 3 | 40:60 | +++ | +++ | + | − | ++ | ++ |
| CoPLA 17 | arH 2 | Cit 3 | 45:55 | +++ | ++ | + | + | + | + |
|  |  |  | 40:60 | +++ | ++ | ++ | + | ++ | + |
| CoPLA 19 | arH 2 | Cit 3 | 45:55 | +++ | + | ++ | − | + | + |
|  |  |  | 40:60 | +++ | + | + | -- | ++ | + |
| CoPLA 21 | arH 2 | Cit 3 | 45:55 | +++ | ++ | ++ | − | ++ | ++ |
|  |  |  | 35:65 | +++ | ++ | ++ | − | + | ++ |

| | +++ | --- |
|---|---|---|
| Compatibility | very highly miscible, no | not miscible |
| Homogeneity | deposition | deposition; semolina-like |
| Viscosity | very high | low, liquid |
| Hardness | very hard | very soft |
| Toughness | very tough, stretchable | not stretchable |
| Finger tack | high tack | no tack |

The selection and assessment of the property features in the representation of the results (Table 4) is based on the subjective characterization of the particular formulation and within the evaluation relates to the desired property profile. In order to be able to achieve this objective, the components used must first be able to be termed compatible. This statement relates primarily to the melting and mixing operation. The other estimations, in contrast, relate to the product that has already cooled. Homogeneity here means that no instances of deposition are developed. The assessment of the viscosity constitutes the delimitation between liquid and solid. In the case of the hardness and toughness, the stretchability and strength is taken into account. The "finger tack" method is used to evaluate the inherent tack.

The base formula with a BM fraction of 25% (Table 5) results from the results set out for the formulations, and is used as a foundation for the future procedure. The TF/PZ fraction of 75% in total breaks down into the different ratios above.

TABLE 5

Base formula for the formulation with a BM fraction of 25% and with different ratios of aromatic resin to citrate

| Component | wt % [$m_{tot}$ = 50 g] | | | |
|---|---|---|---|---|
| Binder | 25 | | | |
| Aromatic resin | 75 | 33.75 | 30.00 | 26.25 |
|  |  | 45:55 | 40:60 | 35:65 |
| Citrate |  | 41.25 | 45.00 | 48.75 |
| Antioxidant | 1.0 | 1.0 | 1.0 | 1.0 |

In the resin/citrate ratio range of 55:45 to 65:35 there is a need for further investigation. It is thought that different PLAs and CoPLAs have different effects on the property features.

Furthermore, there have to date been indications that an increase in the binder fraction to 30% or 35% likewise results in a change to the product properties.

3.3. Investigation of Base Formulations for Adhesive Compositions

For these investigations of the adhesive formulations, a base formula was first specified, from preliminary experiments, with base components which serve as a foundation for all comparative tests (Table 6).

TABLE 6

Base formula with the proportions of components used (backbone polymer, tackifier, plasticizer, antioxidant)

| Component | Weight fractions [$m_{tot}$ = 50 g] |
|---|---|
| Polymer | 25.0 |
| Hydrocarbon resin | 45.0 |
| Tackifier/plasticizer system (ratio 60:40) | |
| Citrate | 30.0 |
| Antioxidant | 1.0 |

The components used are the above-described backbone polymers based on polylactic acid (25%), hydrocarbon resins as tackifiers (45%), citric esters as plasticizers (30%), and also an antioxidant, namely 2,2-bis(((3-(3,5-di-tert-butyl-4-hydroxyphenyl)propanoyl)oxy)methyl)propane-1,3-diyl bis(3-(3,5-di-tert-butyl-4-hydroxyphenyl)propanoate), which is added to the formula in a fraction of 1%. This formula is based on the above-described investigations into the compatibility of the components and inherent tack of the formulations.

The results of the estimation of formulation properties are set out by way of example in the table below (Table 8) and described with the aid of the associated key in Table 7.

TABLE 7

Key to the evaluated property features of the formulations

|  | +++ | --- |
|---|---|---|
| Homogeneity | no depositions | semolina-like, phase separation |
| Viscosity | high, no flow | low, liquid |
| Strength | solid, elastic | soft, plastically deformable |
| Toughness | very tough, stretchable | not stretchable, tearing |
| Finger tack | high inherent tack | no inherent tack |

The requirements imposed on the formulated adhesives can be described using, as an example, the property profile of a commercially available pressure-sensitive adhesive (PSA) specimen, also referred to hereinafter as market product 1. In addition to a pronounced inherent tack (finger tack +++), one of the main requirements is for the homogeneity of the individual components (+++). In the case of inhomogeneous mixtures, phase separations or the like, an adverse effect on adhesiveness can be assumed. The evaluations with regard to the viscosity, strength and toughness should be viewed in the context. The trade-off between strength and toughness is that the material is stretchable in the sense of tough, and does not tear or break. Nevertheless, a certain strength is required in order to make the material as cohesive as possible. This contrasts with a low viscosity, describing a liquid material which is neither tough nor strong. The strength would have to be so high that the material on the one hand is not in liquid form and on the other hand is neither hard nor brittle, so that tearing occurs only under very great stretching stress.

TABLE 8

Visual evaluation of property features of the market product and comparison with the formulation of pure poly-L-lactic acid as per the base formula

| Polymer type (in formulation as per base formula) | Property features | | | | |
|---|---|---|---|---|---|
| | Homogeneity | Viscosity | Strength | Toughness | Finger tack |
| Pure poly-L-lactic acid | ++ | ++ | ++ | -- | -- |
| Market product 1 | +++ | + | + | +++ | +++ |

With this comparison, the greatest difference is in the toughness. The PLA formulation is viscous and solid, but possesses no stretchability at all, and so the material tears very easily. With the PLA formulation, moreover, there are good indications in relation to homogeneity and inherent tack. Further characterization of the formulations under consideration takes place at the present point in time, both by rheology and by oscillation measurement, and also on the basis of a peel experiment on pressure-sensitive-adhesive strips.

For these two methods, a corresponding reference product in each case was selected as a basis for comparison:

| DMA | Market product 1 |
|---|---|
| 180° peel test | Market product 2 |

The experimental selection of references is used for improved comparability of the individual results. The bond strength found in the 180° peel test is compared directly with a commercially available adhesive strip (market product 2), in order to rule out the film coating operation in the manufacture of test specimens. Described below first of all are the results of investigation on the selected reference materials, with the subsequent part of the results containing the outcomes in the formulation experiments.

DMA Investigation of the Reference Material (Market Product 1)

From a comparison of the curves of polymer and of reference it can be stated that their behaviour is similar. However, the decisive rises and falls in the formulation curves are shifted by about 30 to 40° C. in the direction of lower temperatures. As compared with the market product 1 reference, these characteristic ranges of the curves in both samples (formulation and polymer) are situated at lower temperatures.

Investigation of the Reference Material in the 180° Peel Test (Market Product 2)

The requirements on the coatweight for the adhesives are between 10 and 25 $g/m^2$ according to application, and so a guide value in the middle range, of 18 $g/m^2$, was chosen for the tests. The sample strips produced as described above are processed to test specimens in accordance with the AFERA procedure, and subjected to measurement.

The measurements of the market product 2 film strips result in an average for the peel force of 2.9 N/10 mm, with a standard deviation of ±0.036 (1.2%). This is employed as the reference value for the investigations.

3.3.1. Investigations with Backbone Polymers Based on Pure Polylactic Acids

First of all polymers based on pure lactic acid with and without D fraction were formulated as adhesives on the basis of the base formula. The first assessment of the property profile was made visually and also by tactile means, using the "finger tack" method, for example, and is set out here in table form.

TABLE 9

Visual evaluation of property features of the formulations of the base formula. Columns on the left: listing of the 2 relevant backbone polymer types with different composition (with 20% or 50% D fraction). Compare: formulation with pure PLA and market product 1.

| Polymer type (in formulation as per base formula) | | Property features | | | | |
|---|---|---|---|---|---|---|
| | | Homogeneity | Viscosity | Strength | Toughness | Finger tack |
| +D fraction | 20% | ++ | ++ | - | ++ | ++ |
| | 50% | - | + | -- | ++ | + |
| Pure poly-L-lactic acid | | ++ | ++ | ++ | -- | -- |
| Market product 1 | | +++ | + | + | +++ | +++ |

The formulations of the two polymers with D fraction are both notable for improved properties in terms of toughness and viscosity. The material, however, is very soft, which although providing a certain stretchability nevertheless lowers the internal strength. Since no other changes are made to the formula, this can be attributed to the modified properties of the backbone polymer. The formulation with 50% D-fraction polymer shows signs of incompatibility in the form of inhomogeneity. The inherent tack, tested by means of finger tack, is more pronounced for the formulation of 20% D-fraction polymer, and is comparable with the formulation of pure poly-L-lactic acid. On the basis of this estimation, backbone polymers with a D fraction of 20% suggest the greater potential.

The differences in the visual assessment of the formulations can be described first of all using the DMA investigations on the polymers. The comparison of both polymers with D-fraction modification shows very similar curve profiles. Based on the pure poly-L-lactic acid, slight deviations can be ascertained.

This confirms the findings from Table 9, which suggest a positive ongoing development of the formulations with 20% D-fraction polymers.

The results afforded by the DMA measurements on the formulations with the two D-fraction-modified polymers are curve profiles that are virtually congruent. To achieve the characteristics of market product 1, the curves of the formulations would have to be shifted further to higher temperatures.

The visual assessment (homogeneity) and the evaluation of the DMA curves confirm the assumption that a certain fraction of D-lactide in the polymer leads to improved properties on the part of the adhesive.

3.3.2. Investigations with Backbone Polymers Based on Copolymers of Polylactic Acids and Polyols The copolymers with polyols, polypropylene glycol (PPG) and polyethylene glycol (PEG), were likewise formulated in accordance with the base formula, and the property features were assessed visually by analogy with the description, using the legend in Table 7.

TABLE 10

Visual evaluation of property features of the formulations of the base formula. Columns on the left: listing of the 3 relevant backbone polymer types with different composition (copolymers with 20% or 50% polyol component). Compare: formulation with pure PLA and PDLA 20% D, market product 1.

| Polymer type (in formulation as per base formula) | | Homogeneity | Viscosity | Strength | Toughness | Finger tack |
|---|---|---|---|---|---|---|
| PPG2000 | 50% | ++ | -- | --- | + | + |
|  | 20% | ++ | + | -- | ++ | ++ |
| PEG1000 | 50% | + | -- | --- | + | + |
| Pure poly-L-lactic acid | | ++ | ++ | ++ | -- | -- |
| 20% D fraction | | ++ | ++ | - | ++ | ++ |
| Market product 1 | | +++ | + | + | +++ | +++ |

A further possibility of utilizing the advantages of the PLA-polyol copolymers in terms of their low glass transition temperatures as a result of PPG or PEG is to bring about a chain extension by diisocyanates and in so doing to exert a positive influence on the properties via a higher molecular weight. Another path lies in the direct chain extension through diisocyanate at the OH termini of oligomeric lactic acid.

3.3.3. Investigations with Backbone Polymers Based on Polyesterurethanes

Further polymers with a 20% D fraction with polyesterurethanes, consisting of different diols with isomeric MDI, were looked at. They were formulated according to the base formula for adhesives, and then investigated (Table 11).

It was possible to improve the formulation properties, but there continued to be deficits in terms of toughness. In contrast, better strength properties and in particular an improved inherent tack were found.

The formulations of the abovementioned backbone polymers (Table 11) were investigated on the basis of their visually assessed properties and inherent tack by means of DMA and also in accordance with the procedure for the 180° peel test.

In the case of the DMA measurement of the crude polymers, the polymer with 1,2-hexanediol shows a highly promising result for the curve profiles at temperatures above 80° C.

For all of the polymers investigated it is apparent that the curves, in contrast to those so far, display a shift to higher temperatures (to the right).

The formulations with the abovementioned polymers (Table 11) were investigated for their bond strength using the 180° peel test. The experimental procedure is in accordance with AFERA standard 5001 (DIN EN 1939). Differences are discernible according to the construction of the backbone polymer used. With certain formulations, the reference value is attained or even exceeded.

Comparison with the measurements of the first formulations, with pure PLA and also with 20% D fraction, shows that the use of branched diols in the polymer has a positive influence on the bond strength. The formulations of the polymers with 1,2-hexanediol or 2-ethyl-1,3-hexanediol, with values between 2.5 and 3.5 N/10 mm, show highly promising results. If the DMA results are recruited, the polymer modified with 1,2-hexanediol may be accorded the greater potential for use as a backbone polymer.

The fracture modes after the 180° peel tests showed very great differences in comparison to the reference. In contrast to complete adhesive fracture to the reference sample (market product 2), the fracture mode for the formulations tested was apparent as virtually complete transfer of the layer of adhesive from the coated backing sheet to the stainless steel substrate.

3.3.4. Investigations with Backbone Polymers Based on Polylactic Acids and Epoxides As an alternative to the PEU polymer products, copolymers with JONCRYL® 4368-CS were synthesized and the formulations, corresponding to the base formula, were investigated. The assessment was made visually to start with, in analogy to the other samples of adhesive.

TABLE 11

Visual evaluation of property features of the formulations of the base formula. Columns on the left: listing of the 2 relevant backbone polymer types with different composition (2-ethyl-1,3-hexanediol (2-E-1, 3-HD), 1,2-hexanediol (1,2-HD)). Compare: formulation with PDLA 20% D, 1,4-butanediol, MDI$_{isomeric}$; market product 1.

| Polymer type (in formulation as per base formula) | | | Homogeneity | Viscosity | Strength | Toughness | Finger tack |
|---|---|---|---|---|---|---|---|
| 20% D fraction | 2-E-1, 3-HD | +MDI$_{isomeric}$ | ++ | ++ | ++ | - | ++ |
|  | 1,2-HD |  | ++ | ++ | ++ | - | +++ |
| 20% D fraction | 1,4-BDO | +MDI$_{isomeric}$ | ++ | + | + | ++ | ++ |
|  | Market product 1 |  | +++ | + | + | +++ | +++ |

TABLE 12

Visual evaluation of property features of the formulations as per base formula. Columns left: listing of 2 relevant backbone polymer products with different fractions (2.5% or 5%) of JONCRYL® 4368-CS. Compare: PDLA 20% D, 1,2-hexanediol, market product 1

| Polymer type (in formulation as per base formula) | | | Property features | | | | |
|---|---|---|---|---|---|---|---|
| | | | Homogeneity | Viscosity | Strength | Toughness | Finger tack |
| 20% D fraction | JONCRYL® 4368-CS | 2.5 wt % | ++ | + | + | ++ | +++ |
| | | 5.0 wt % | ++ | + | + | ++ | +++ |
| 20% D fraction | 1,2-HD | +MDI$_{isomeric}$ | ++ | ++ | ++ | − | +++ |
| Market product 1 | | | +++ | + | + | +++ | +++ |

The modification of the polymers with JONCRYL® results in further improvements to properties of the formulation. By means of the polymer with a fraction of 5% it was possible to observe a positive effect on the inherent tack of the formulation. In addition, advances were achieved in viscosity and toughness. The formulations based on the backbone polymers set out in Table 12 in their formulations were also investigated by means of DMA and the 180° peel test.

In the case of the DMA measurement of the crude polymers with 2.5% or 5% JONCRYL® fraction, the polymer with 1,2-hexanediol is employed for comparison. The polymer with 1,2-hexanediol showed very good results.

The formulations of the polymers with different JONCRYL® fractions (Table 12) were investigated for their bond strength using the 180° peel test. The result for the formulation of the polymer with the higher JONCRYL® fraction of 5% exhibits not only a value within the reference range (2.5 N/10 mm) but also an improved fracture mode. The results that are the most highly promising so far lie at values around 3.5 N/10 mm, in comparison to the reference sample (market product 2), at 2.9 N/10 mm. Contrary to the supposition from the DMA results, improvements were achieved in the fracture mode. With both formulations of the JONCRYL® polymers, cohesive fracture is found to a very large extent. This is a significant improvement, since the transfer of the adhesive layer from sheet to substrate was reduced very greatly. In the case of the reference, in contrast, there is exclusively adhesive fracture.

4. Performance Investigations
4.1. Analytical Methods
Viscosity

The viscosity is determined using a Brookfield rotary viscometer in accordance with DIN 53019 and DIN EN ISO 2555.

DMA

The measurement takes place using a plate/plate system. The sample was heated in 2° C. steps (10 rad/s).

For the subsequent measurements, films of adhesive with a width of 25 mm are produced using a 30 μm four-way bar applicator on a Hostaphan sheet 36 μm thick. The opposing substrate used comprises stainless steel plates:

Loop Tack

The loop tack is determined in accordance with FTM9.

180° Peel Strength

The 180° peel strength is determined in accordance with FTM1. The test specimens are conditioned for 20 minutes prior to testing.

SAFT (Shear Adhesion Failure Temperature)

The SAFT value is determined in accordance with ASTM D4498-07. The area of the overlap between the stainless steel plate and the Hostaphan sheet is 25 mm×25 mm. The bond is loaded with a 100 g weight. The test specimens are conditioned for 10 minutes prior to testing. The oven temperature is 40° C. at the start and is raised by 5° C. at 13-minute intervals.

4.2. Investigation of the Adhesive Suitability of the Backbone Polymers and Optimization of the Formulas For all of the applications identified below, a large part is played by the thermal stability of the adhesive. The properties of the adhesive ought not to be seriously affected by a thermal load at processing temperature for 8 h, allowing the user of the adhesive to continue production largely without restriction even in the event of disruption or if consumption levels are low. For this purpose, a sample of adhesive is exposed at processing temperature for 48 h. At eight-hour intervals, the sample is investigated for development of colour and for phenomena such as phase separation, cracking, etc.

3 specimens were investigated, with the designations specimen 1 (OLA-COOH+PBS—OH (80/20), $M_n$=2030 g/mol), specimen 2 (OLA-COOH+PPG2000 (80/20), $M_n$=3500 g/mol) and specimen 3 (pure PLA, post-condensed, $M_n$=2600 g/mol). The composition is set out in Table 13.

TABLE 13

Composition of the formulated PLA samples

| Experiment | Fraction of polymer [%] | Fraction of Novares TNA 120 [%] | Fraction of Novares TV 100 [%] | Fraction of Citrofol B II [%] |
|---|---|---|---|---|
| Specimen 1 | 25.00 | 32.50 | 16.25 | 26.25 |
| Specimen 2 | 25.00 | 32.50 | 16.25 | 26.25 |
| Specimen 3 | 25.00 | 30.00 | 15.00 | 30.00 |

The technical adhesive values found are reproduced in Table 14.

TABLE 14

Technical adhesive values for the formulated PLA samples and model systems in comparison
(the fracture mode is generally 100% adhesive fraction. If cohesive fraction (CF) or transfer occurs, this is noted.)

| Experiment | Specimen 1 | Specimen 2 | Specimen 3 | PSA for assembly bonds | PSA for impact sound insulation nozzle application | PSA for impact sound insulation roll application | PSA for labelling |
|---|---|---|---|---|---|---|---|
| Viscosity 120° C. [mPas] | 124 | 165 | 160 | | | | |
| Viscosity 160° C. [mPas] | | | | 16 000 | 600 | 22 000 | 500 |
| Colour in the melt | brown opaque | brown opaque | brown cloudy | yellow transparent | brown transparent | brown transparent | brown transparent |
| SAFT (40° C.) [° C.] | 40 | 40 | 40 | 90 | 55 | 100 | 45 |
| Loop tack [N/25 mm] | 19.3 (40% CF) | 12.3 (40% transfer) | 0.3 (40% CF) | 21.1 | 8.4 | 21.6 | 8.2 |
| 180° peel strength [N/25 mm] | 12.0 (40% CF) | 14.6 (40% CF) | 0.5 (50% CF) | 18.2 | 5.9 | 11.7 | 4.1 |

A striking feature of the formulated PLA samples is the very low viscosity. It is 120-170 mPa·s at 120° C. In comparison to this, the viscosity of conventional hot-melt PSAs is generally found to be between 140 and 180° C., and is significantly higher here, with typical values of 500 to 30 000 mPa·s.

The requirements in terms of cohesion and heat stability for an adhesive differ greatly according to the field of application.

The relatively low cohesion of the specimens is also reflected in the values determined for the 180° peel strength. The 180° peel strength is a measure of the bond strength. In contrast to the SAFT value, the 180° peel strength is affected not only by the cohesion, but also by the adhesion of the adhesive. The values for specimen 1 and specimen 2 are located in the middle segment. In contrast to conventionally based hot-melt PSAs, there is no pure adhesive fracture, but instead cohesive fracture to a high degree as well. This behaviour is generally observed only for relatively soft systems.

In order to assess the inherent tack of the hot-melt PSAs, the loop tack was measured. Using the specimen 1 and specimen 2 formulations, satisfactory values were already achievable. The loop tack is an important parameter for assessing the inherent tack and the wetting capacity at room temperature. A high value here is a very important precondition for applications in which substrates are made self-adhesive and in which joining to the second substrate takes place at temperatures significantly below the processing temperature.

4.4. Investigation of Specific Adhesive Compositions

As a supplement to the general performance experiments outlined above, further experiments for the investigation of specific adhesive systems, in terms of their applications properties, were also conducted.

The adhesive compositions contain polymer 1 or polymer 2 as polylactic acid-based base polymer or backbone polymer.

Polymer 1 is obtained from oligomeric, hydroxy-terminated lactic acid with an acid number AN≥30 and an average molar mass $M_n$=2900 g/mol by reaction with diphenylmethane diisocyanate having a high fraction of 2,4'-diphenylmethane diisocyanate. The oligomeric, hydroxy-terminated lactic acid has a ratio of L- to D-lactic acid of 18:20 and is prepared by polymerization in the presence of 1,2-hexanediol. Polymer 1 has average molar masses of $M_w$=7000 g/mol and $M_n$=13 200 g/mol.

Polymer 2 is obtained from oligomeric, hydroxy-terminated lactic acid with an acid number AN 10 and an average molar mass $M_n$=4500 g/mol by reaction with diphenylmethane diisocyanate having a high fraction of 2,4'-diphenylmethane diisocyanate. The oligomeric, hydroxy-terminated lactic acid has a ratio of L- to D-lactic acid of 80:20 and is prepared by polymerization in the presence of 1,2-hexanediol. Polymer 2 has average molar masses of $M_w$=14 700 g/mol and $M_n$=30 800 g/mol.

In addition to the base or backbone polymers, the adhesive compositions further comprise resins, plasticizers and tackifiers, and also antioxidants and other adjuvants.

The adhesive compositions contain in particular the following ingredients:

Novares TV-100, a hydrocarbon resin which is a product of polymerization of unsaturated aromatic C9 and C10 hydrocarbons.

Novares TNA 120, a crude oil-based hydrocarbon resin which is a polymer of unsaturated, aromatic C9 and C10 hydrocarbons with phenol.

The Novares resins can be acquired from RUTGERS Novares GmbH, Duisburg, Germany.

IRGANOX®, a primary, phenol-based antioxidant [pentaerythritol tetrakis(3-(3,5-di-tert-butyl-4-hydroxyphenyl) propionate)], available from BASF SE.

Citrofol® B1, a plasticizer based on citric esters, available from JUNGBUNZLAUER Ladenburg GmbH, Ladenburg, Germany.

Pearlbond® Eco D590, a crystallization additive and viscosity regulator based on a linear, aromatic thermoplastic polyurethane, available from DANQUINSA GmbH, Dettenhausen, Germany.

Dynacoll® Terra EP 424.01, a hydroxyl-containing copolyester based on renewable raw materials, available from EVONIK Industries AG, Essen, Germany.

The various components are mixed in different compositions—as indicated in Table 15—and then investigated for their technical adhesive properties. The results of the technical adhesive investigations are summarized in Table 16.

TABLE 15

Specific adhesive compositions, all weight amounts in parts by weight

| Components | Sample 1 | Sample 2 | Sample 3 | Sample 4 | Sample 5 |
|---|---|---|---|---|---|
| Polymer 1 | 25.0 | 25.0 | 25.0 | 25.0 | 25.0 |
| Polymer 2 | | | | | |
| Novares TV-100 | 45.0 | 45.0 | 45.0 | 45.0 | 45.0 |
| Novares TNA 120 | | | | | |
| Citrofol ® B1 | 30.0 | 30.0 | 30.0 | 30.0 | 30.0 |
| Irganox ® 1010 | 1.0 | 1.0 | 1.0 | 1.0 | 1.0 |
| Pearlbond ® Eco D590 | | 10.0 | | 10.0 | 10.0 |
| Dynacoll ® Terra EP 424.01 | | | 10.0 | 10.0 | |
| Sum total | 101.0 | 111.0 | 111.0 | 121.0 | 111.00 |

| Components | Sample 6 | Sample 7 | Sample 8 | Sample 9 | Sample 10 |
|---|---|---|---|---|---|
| Polymer 1 | | | | 36.0 | |
| Polymer 2 | 25.0 | 25.0 | 25.0 | | 36.0 |
| Novares TV-100 | 45.0 | 45.0 | 45.0 | 7.2 | 7.2 |
| Novares TNA 120 | | | | 14.4 | 14.4 |
| Citrofol B1 | 30.0 | 30.0 | 30.0 | 14.5 | 14.5 |
| Irganox 1010 | 1.0 | 1.0 | 1.0 | | |
| Pearlbond Eco D590 | | 10.0 | 10 | 3.6 | 3.6 |
| Dynacoll Terra EP 424.01 | | | 10.0 | 24.3 | 24.3 |
| Sum total | 101.0 | 111.0 | 121.0 | 100.0 | 100.00 |

TABLE 16

Technical adhesive investigations of the adhesive compositions

| | Sample 1 | Sample 2 | Sample 3 | Sample 4 | Sample 5 |
|---|---|---|---|---|---|
| Loop tack [N/25 mm] | 6.5 | 8.7 | 5.9 | 9 | 9.2 |
| 180° peel strength [N/25 mm] | 5.16 | 3.26 | 0.56 | 2.7 | 3.91 |
| SAFT [5° C./13 min] | 40 | 40 | 40 | 40 | 40 |
| Viscosity 120° C. [mPa · s] | 87[1] | 930[2] | 81[1] | 1138[2] | 1000[1] |

| | Sample 6 | Sample 7 | Sample 8 | Sample 9 | Sample 10 |
|---|---|---|---|---|---|
| Loop tack [N/25 mm] | 4.5 | 4.3 | 15.5 | 7.3 | 11.6 |
| 180° peel strength [N/25 mm] | 1.53 | 2.4 | 6.79 | 7.26 | 18.2 |
| SAFT [5° C./13 min] | 40 | 40 | 40 | 40 | 42.5 |
| Viscosity 120° C. [mPa · s] | 164[1] | 1000[1] | 1500[2] | 992[2] | 2500[2] |

[1] spindle 21;
[2] spindle 27

As is evident from the data in Table 16, the adhesive compositions of the invention already possess outstanding technical adhesive properties, and in particular they have an initial tack (loop tack) which is sufficient for the majority of applications and also have a sufficiently high 180° peel strength. As far as the bond strength is concerned, it is apparent that samples 8 to 10 are suitable even for semi-structural applications, i.e. as an assembly aid or as an assembly adhesive in the automotive sector and also in the construction sector.

It is also evident that the adhesive compositions of the invention also possess viscosities which qualify them for application from the melt. The viscosity values at 120° C. are in the range from 87 to 2500 mPa·s.

It is noteworthy, moreover, that the adhesive compositions according to samples 9 and 10 in particular, containing 36 wt % of base polymer or backbone polymer, have particularly good adhesive properties.

The invention claimed is:

1. An adhesive composition based on renewable raw materials in the form of a hot-melt pressure-sensitive adhesive composition, wherein the adhesive composition comprises:
    (a) at least one polymer comprising polylactic acid in amounts of 10 to 60 wt %, based on the total weight of the adhesive composition,
    wherein the polylactic acid comprises L-lactic acid units and D-lactic acid units,
    wherein the ratio of L-lactic acid units to D-lactic acid units is in the range from 85:15 to 60:40:
    (b) at least one resin in 15 to 55 wt %, based on the total weight of the adhesive composition, and
    at least one plasticizing agent in amounts of 3 to 50 wt %, based on the total weight of the adhesive composition;
    wherein the polymer (a) has sections and/or segments of lactic acid units,
    wherein the individual sections and/or segments of lactic acid units have a number-average molar mass Mn in the range from 400 to 8,000 g/mol,
    wherein the polymer (a) has modifications comprising chemical groups or segments, selected from
    (i) polyethers, polyesters, polyamides and/or
    (ii) urethanes, polyurethanes and/or
    (iii) polyacrylates, polymethacrylates, polystyrenes, acrylic/styrene copolymers, styrene copolymers, polyvinyl acetates, polyolefins
    wherein the polymer (a) has a weight-average molecular weight Mw in the range from 5,000 to 75,000 g/mol and
    wherein the polymer (a) has a polydispersity $M_w/M_n$ in the range from 1.0 to 9.

2. The adhesive composition according to claim 1, wherein the adhesive composition has a Brookfield viscosity at 140° C. in the range from 10 to 100 000 mPa·s.

3. The adhesive composition according to claim 1, wherein the adhesive composition comprises components based on renewable raw materials in amounts of 30 to 100 wt %, based on the total weight of the adhesive composition.

4. The adhesive composition according to claim 1, further comprising a wax in amounts of 0.1 to 70 wt %, based on the total weight of the adhesive composition.

5. The adhesive composition according to claim 1, wherein the polymer (a) is terminated by hydroxyl functions and/or by carboxylic acid functions.

6. The adhesive composition according to claim 1, wherein the adhesive composition further comprises at least one additive, wherein the at least one additive is selected from conventional adjuvants, high-boiling organic oils, esters, plasticizers, stabilizers, antioxidants, acid scavengers, fillers, and aging inhibitors, and wherein the adhesive composition comprises the at least one additive in amounts of 0.01 to 10 wt %.

7. The adhesive composition according to claim 1, wherein the adhesive composition has a peel strength, determined according to FINAT Test Method 1, in the range from 1 to 50 N/25 mm, and/or wherein the adhesive composition has a surface tack (Loop Tack), determined according to FINAT Test Method 9, in the range from 1 to 50 N/25 mm.

8. The adhesive composition according to claim 1, wherein the adhesive composition has a thermal stability (Shear Adhesion Failure Temperature; SAFT), determined according to ASTM D4998-07, in the range from 30 to 160° C.

9. A method of joining at least two substrates by adhesive bonding, wherein the method comprises the step of applying to at least one of the substrates an adhesive composition according to claim 1, subsequently followed by joining the substrates at temperatures below the processing temperature of the adhesive composition.

10. The method according to claim 9, wherein the adhesive composition is applied continuously or discontinuously to the substrate and wherein the adhesive composition is applied from the melt.

11. The method according to claim 9, wherein the adhesive composition is applied to the substrate by means of spraying, knife coating, calendering, rolling printing processes, flexographic printing processes, screen printing processes or extrusion, and wherein the adhesive composition is applied with a coatweight of 5 to 250 g/m$^2$ to the substrate.

12. A method for the lamination of plastics or for attaching labels to plastic bottles, wherein the method comprises the use of an adhesive composition according to claim 1.

13. A method for the adhesive bonding of sheet-like materials to planar substrates or to floors, wherein the method comprises the use of an adhesive composition according to claim 1.

14. A method for providing assembly bonds in the automotive or construction industry, wherein the method comprises the use of an adhesive composition according to claim 1.

* * * * *